United States Patent
Fukuchi et al.

(10) Patent No.: US 9,842,435 B2
(45) Date of Patent: *Dec. 12, 2017

(54) IMAGE PROCESSING TO PROVIDE STABLE ENVIRONMENT RECOGNITION

(71) Applicant: SONY CORPORATION, Tokyo (JP)

(72) Inventors: Masaki Fukuchi, Tokyo (JP);
Kenichirou Ooi, Kanagawa (JP);
Tatsuki Kashitani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,754

(22) Filed: Dec. 20, 2016

(65) Prior Publication Data
US 2017/0103578 A1  Apr. 13, 2017

Related U.S. Application Data

(63) Continuation of application No. 15/162,246, filed on May 23, 2016, now Pat. No. 9,552,677, which is a continuation of application No. 14/391,874, filed as application No. PCT/JP2013/002059 on Mar. 26, 2013, now Pat. No. 9,373,196.

(30) Foreign Application Priority Data

Apr. 23, 2012  (JP) .................. 2012-097714

(51) Int. Cl.
| | |
|---|---|
| G09G 5/00 | (2006.01) |
| G06T 19/00 | (2011.01) |
| G06F 3/01 | (2006.01) |
| G06K 9/00 | (2006.01) |
| G06K 9/62 | (2006.01) |

(52) U.S. Cl.
CPC ............ *G06T 19/006* (2013.01); *G06F 3/011* (2013.01); *G06K 9/00671* (2013.01); *G06K 9/6267* (2013.01)

(58) Field of Classification Search
None
See application file for complete search history.

(56) References Cited

U.S. PATENT DOCUMENTS

| | | |
|---|---|---|
| 2009/0243889 A1 | 10/2009 | Suhr et al. |
| 2012/0146998 A1* | 6/2012 | Kim ................... G06T 19/006 345/419 |

FOREIGN PATENT DOCUMENTS

| | | |
|---|---|---|
| JP | 2009-237845 A | 10/2009 |
| JP | 2011-159162 A | 8/2011 |

OTHER PUBLICATIONS

Andrew J. Davison, "Real-Time Simultaneous Localisation and Mapping with a Single Camera", Proceedings of the Ninth IEEE International Conference on Computer Vision, vol. 2, Oct. 13-16, 2003, 8 pages.

* cited by examiner

*Primary Examiner* — Peter Hoang
(74) *Attorney, Agent, or Firm* — Chip Law Group

(57) ABSTRACT

An information processing system that acquires image data captured by an image capturing device; identifies a density of distribution of a plurality of feature points in the acquired image data; and controls a display to display guidance information based on the density of the distribution of the plurality of feature points.

15 Claims, 22 Drawing Sheets

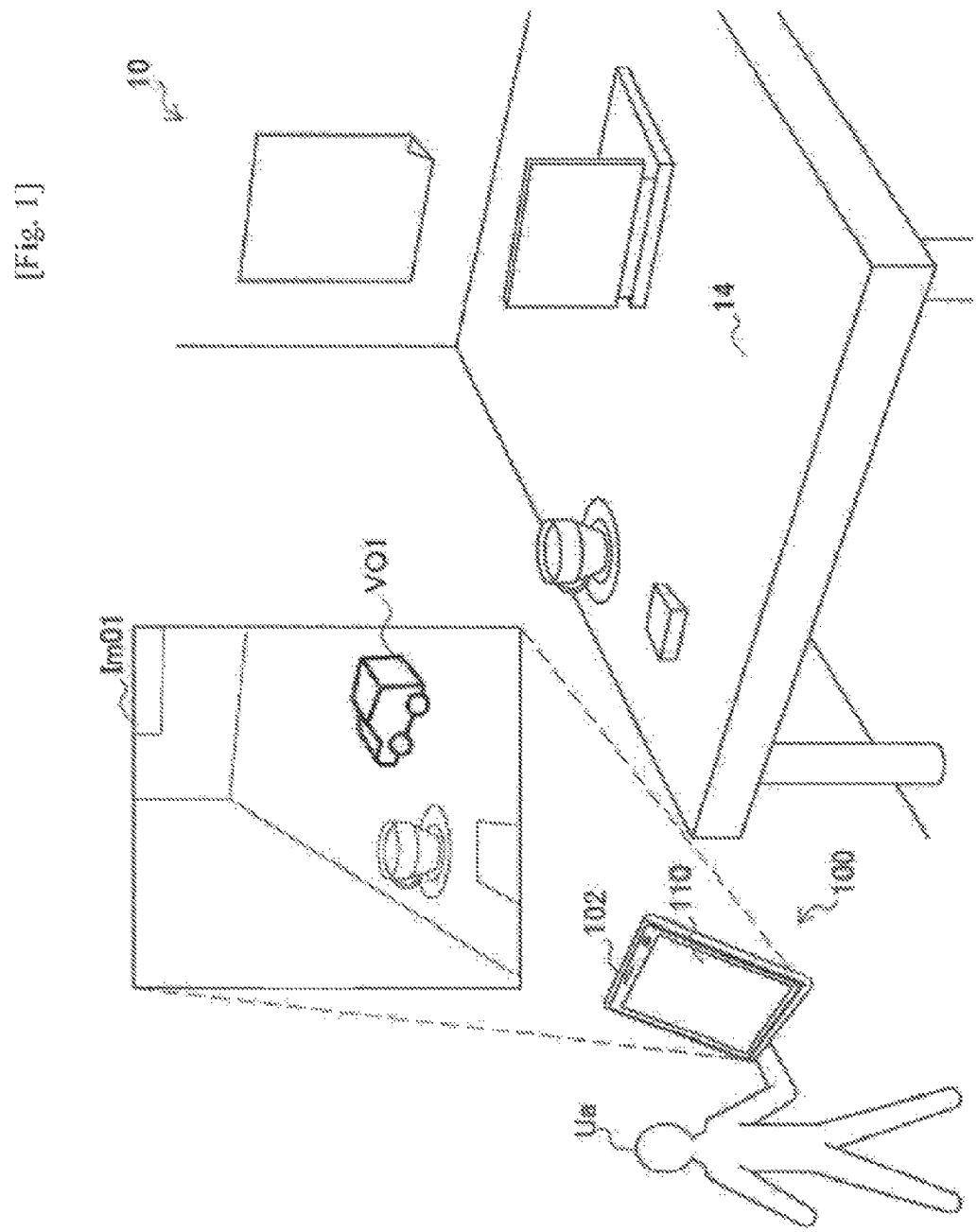

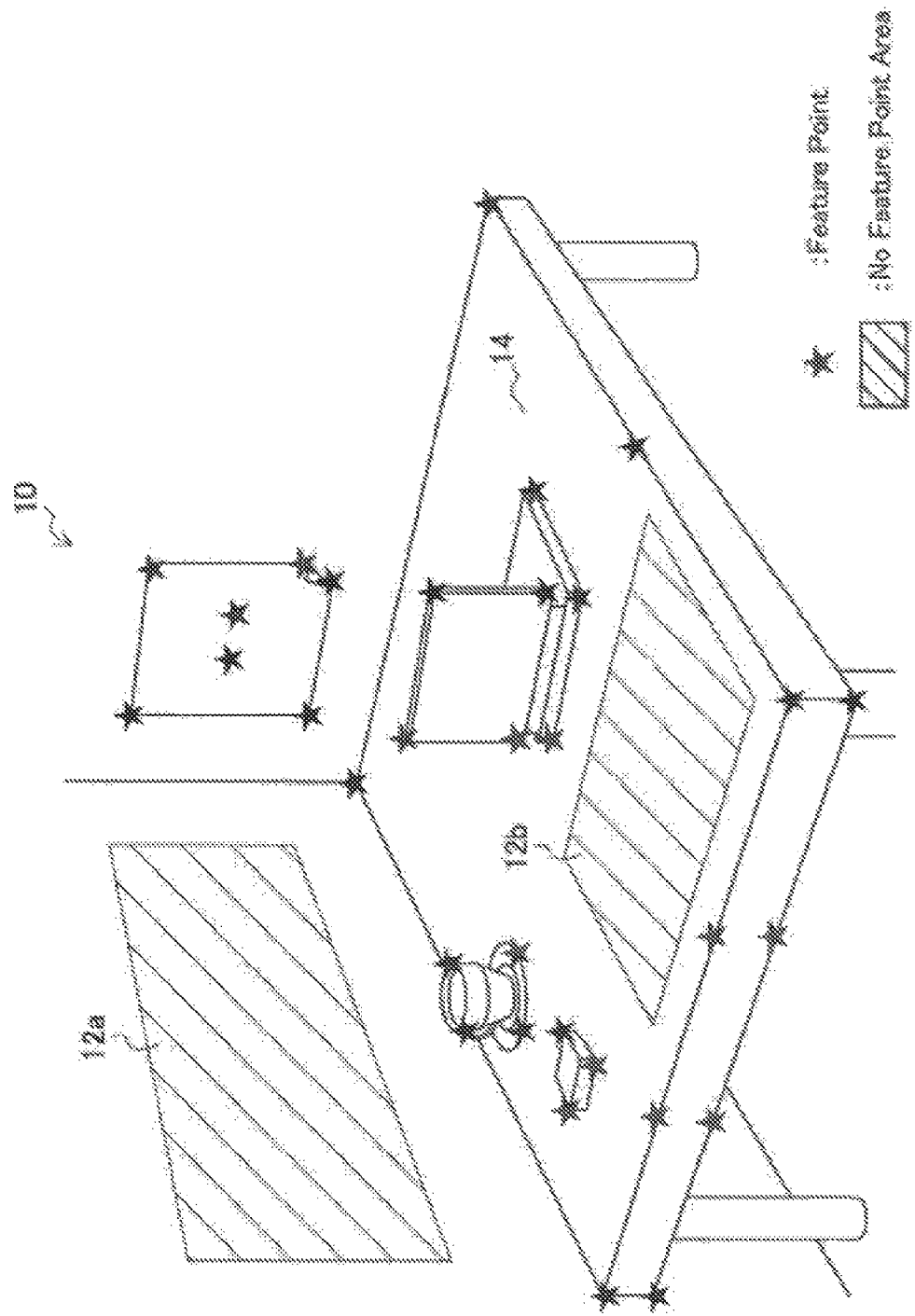

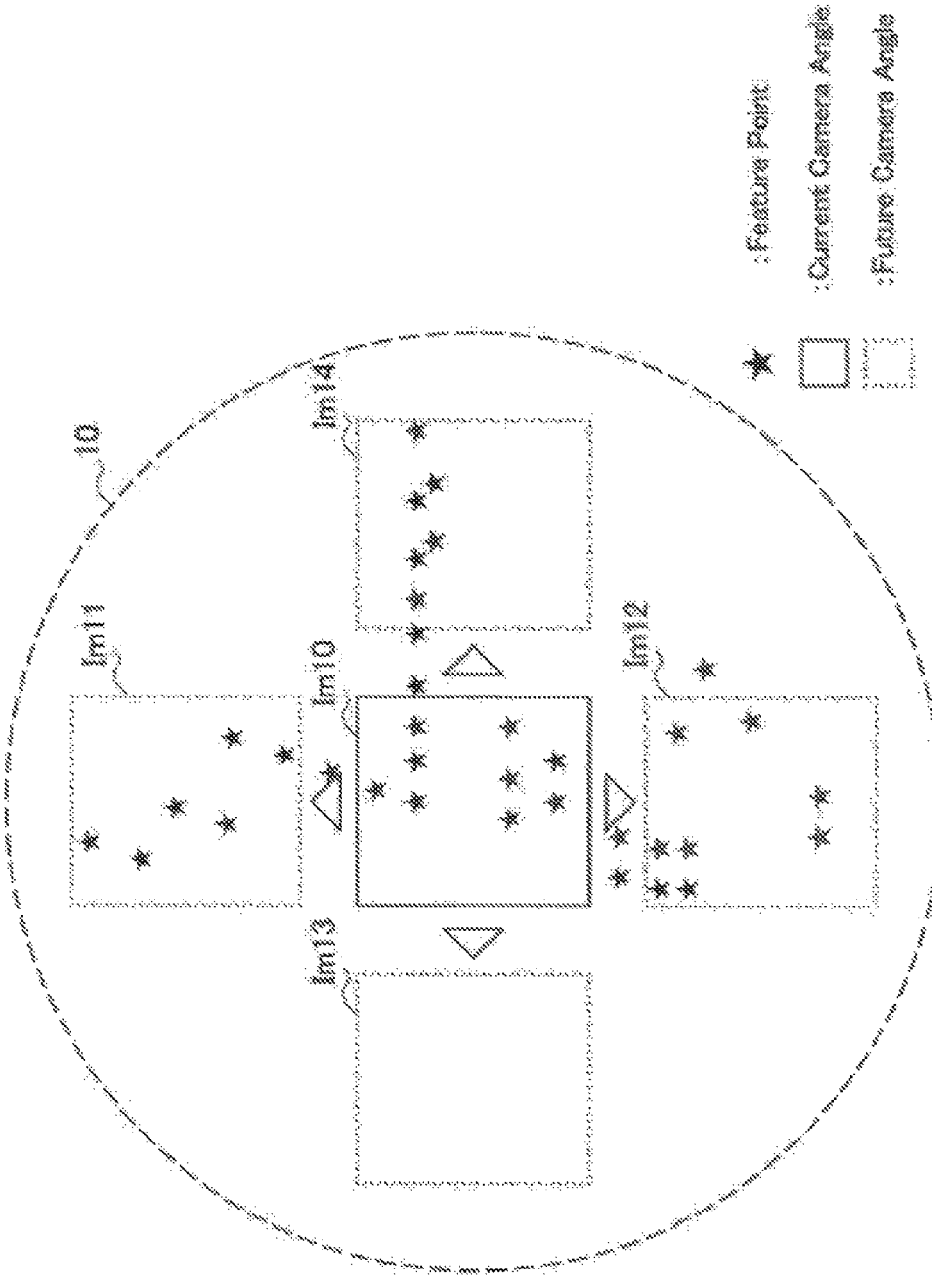

[Fig. 4]
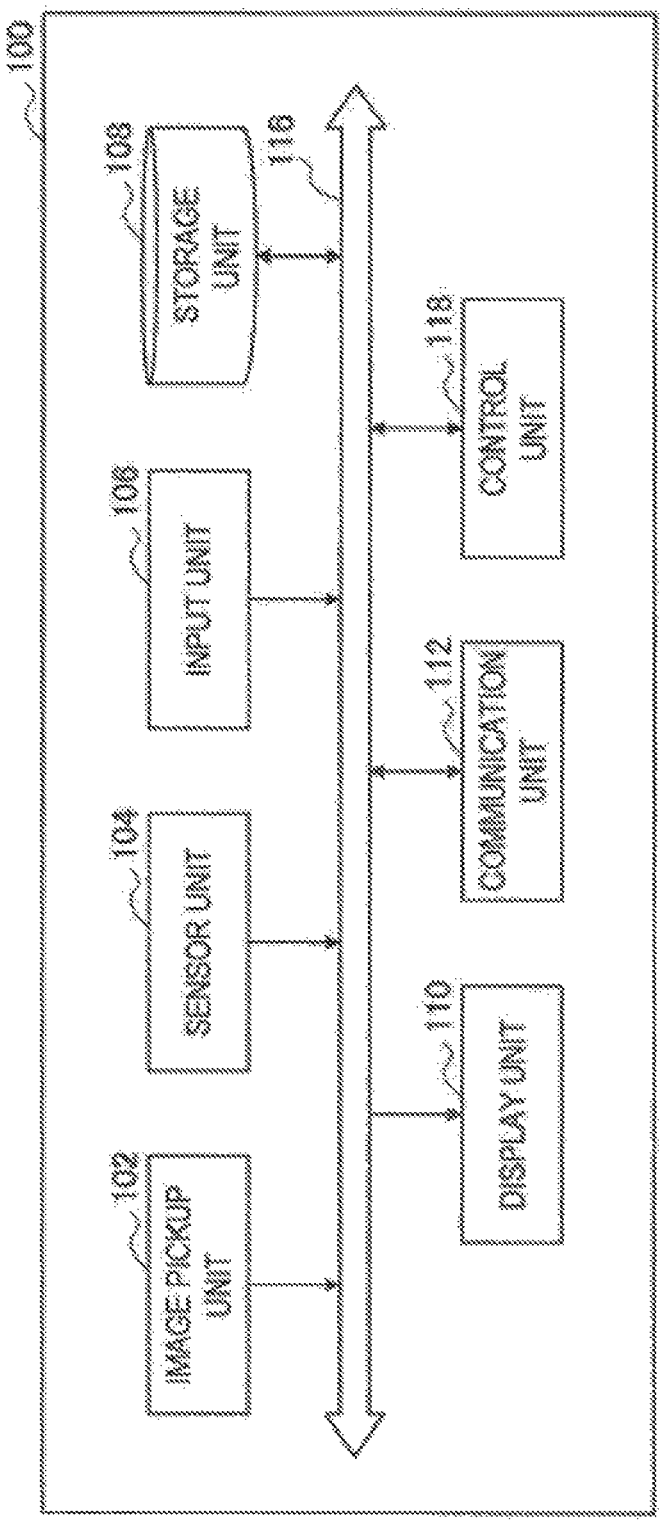

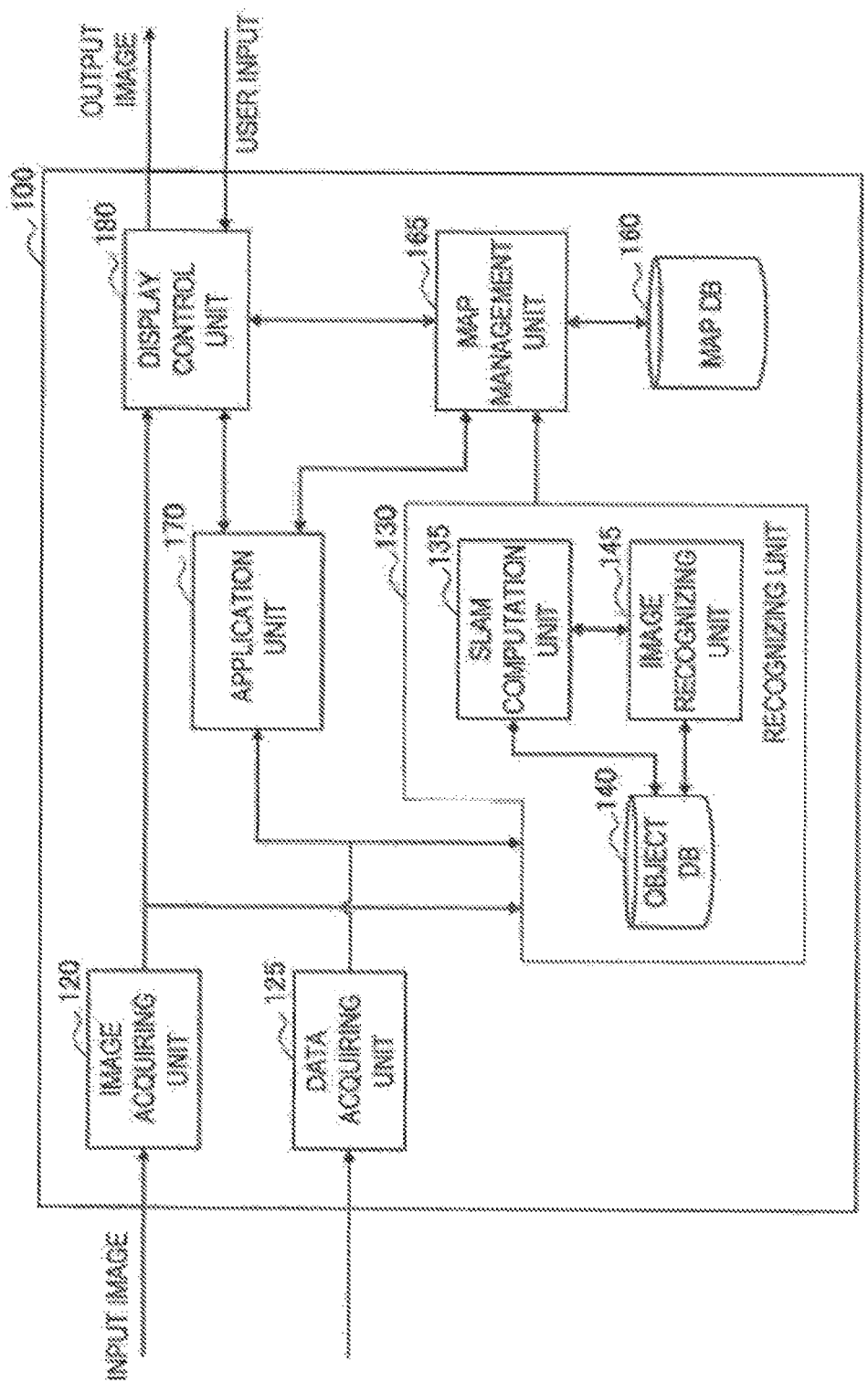

[Fig. 6]
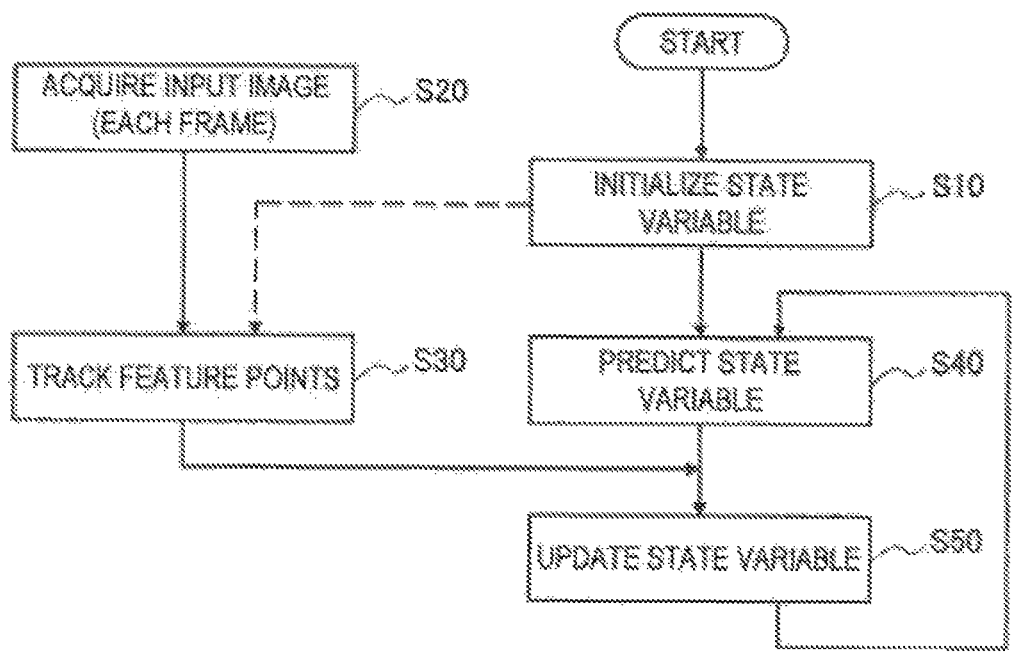
[Fig. 7]
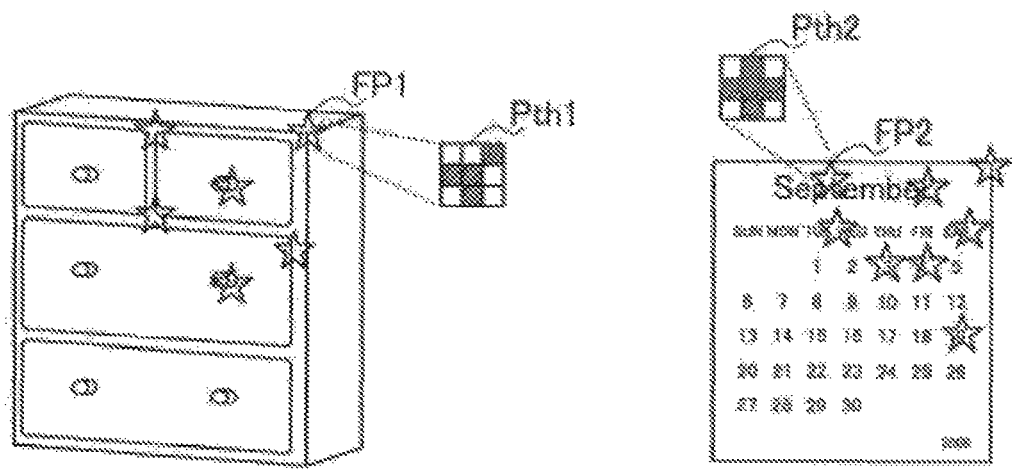

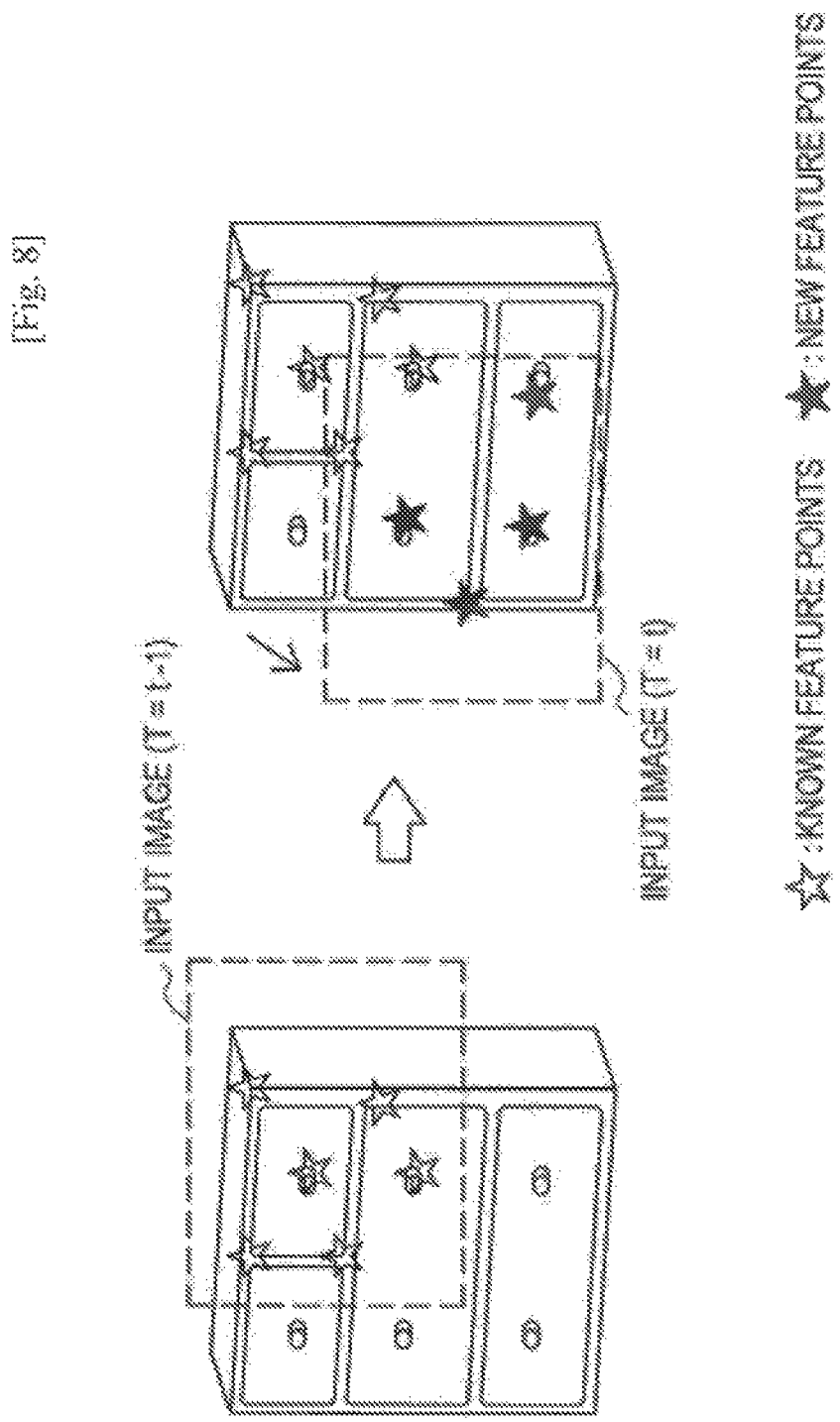

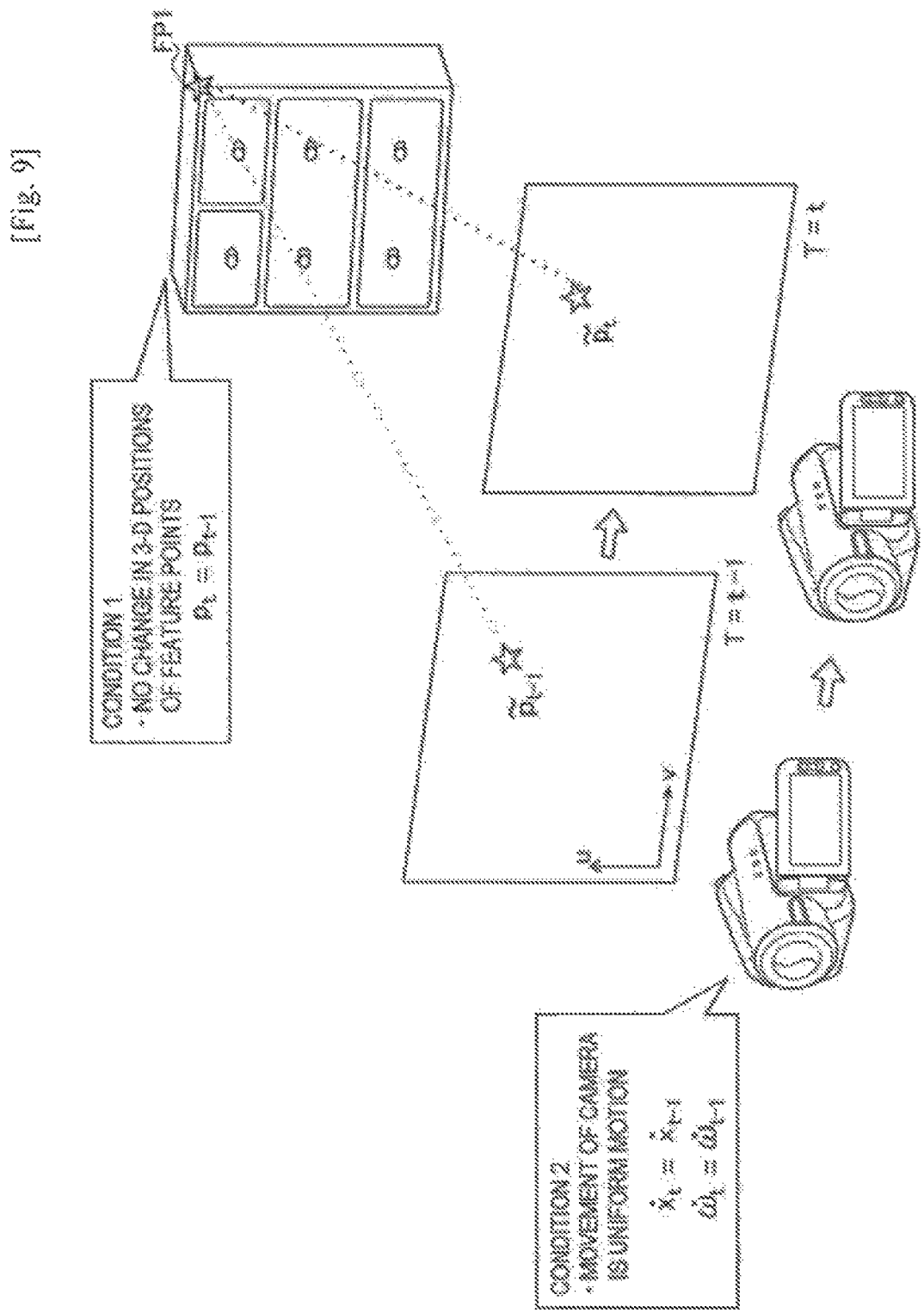

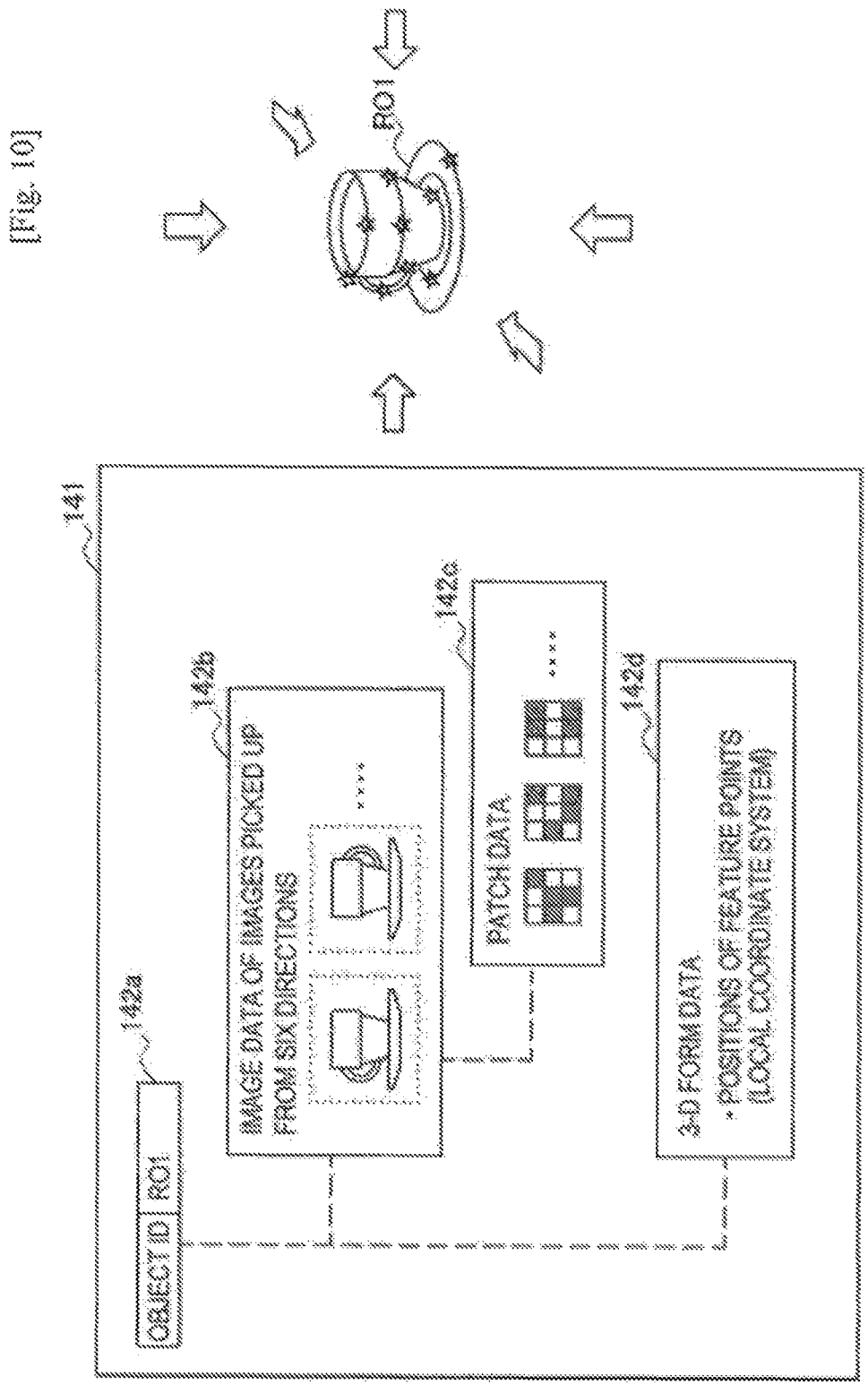

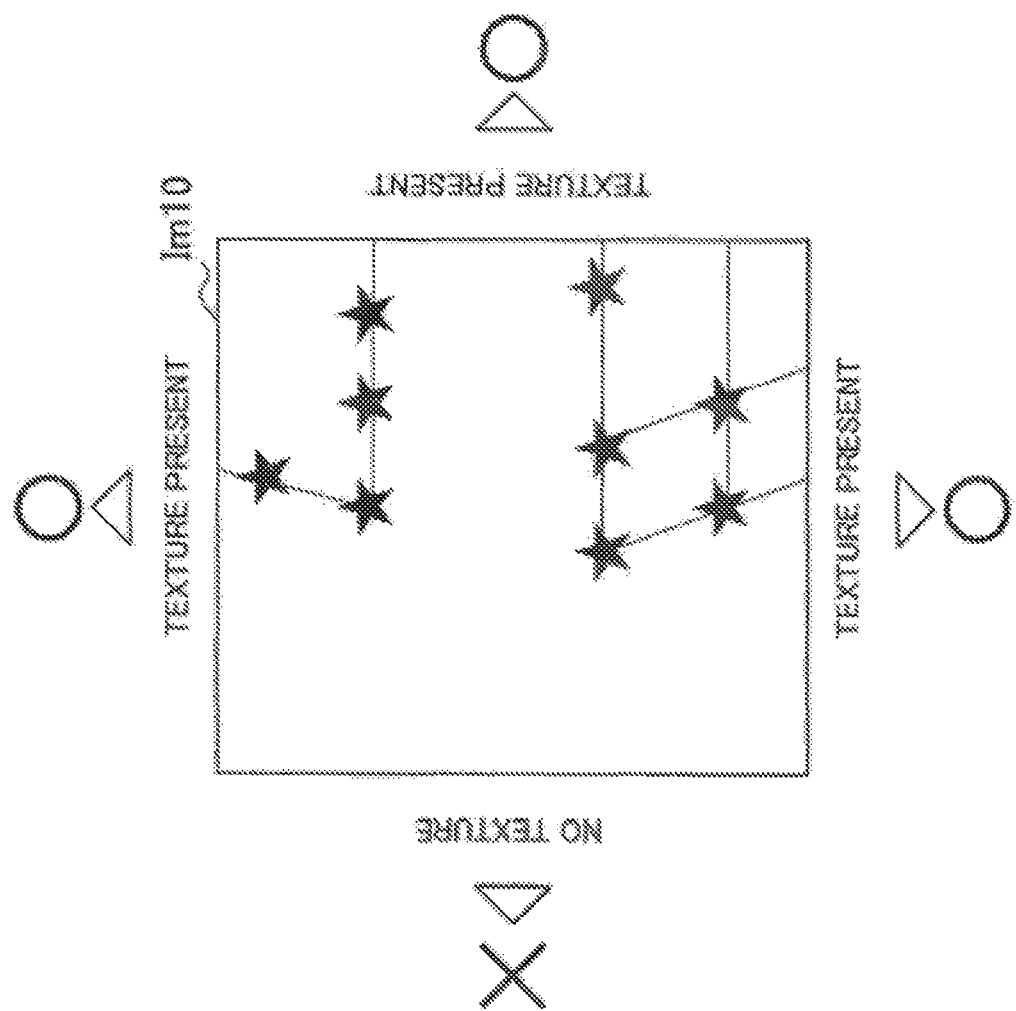

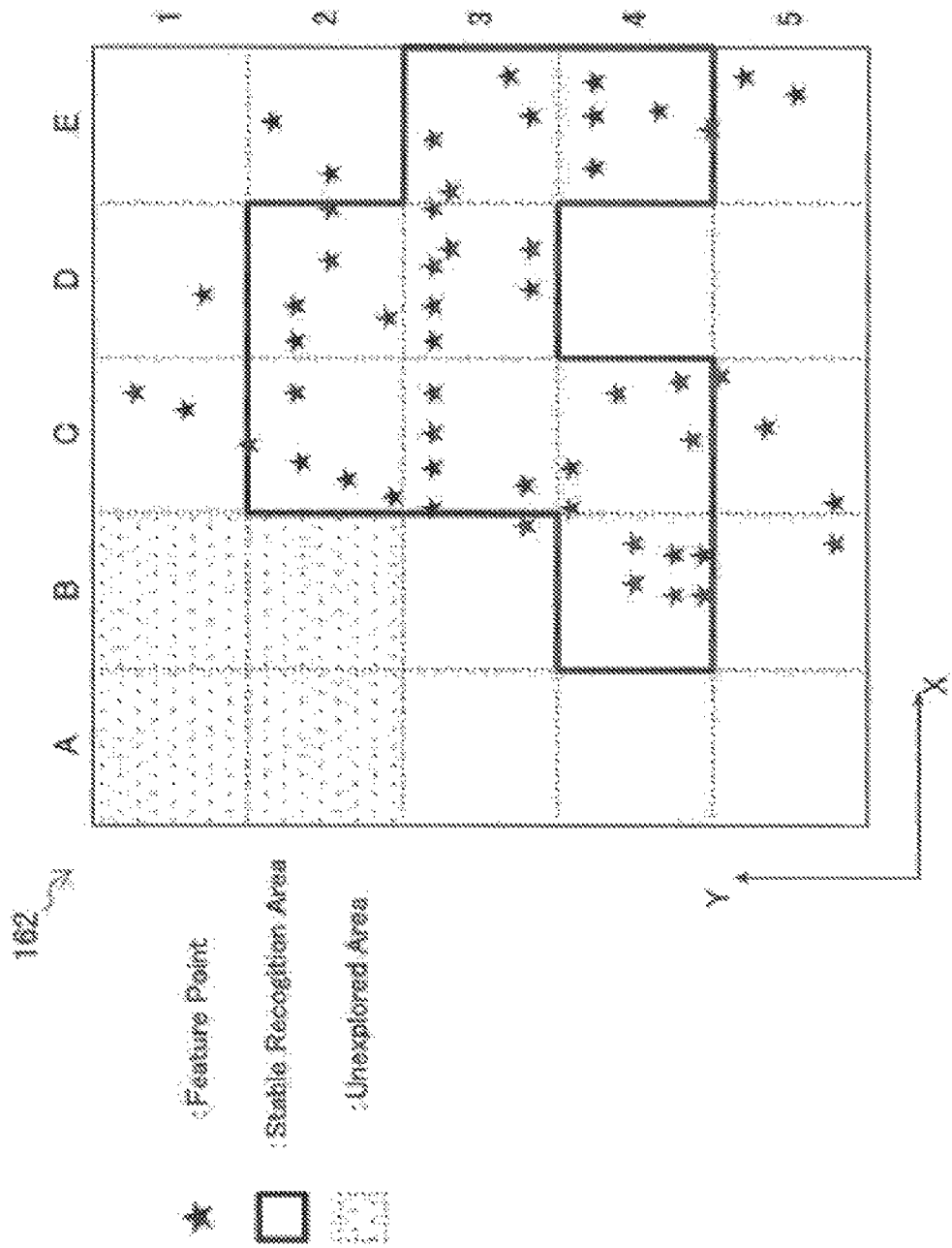

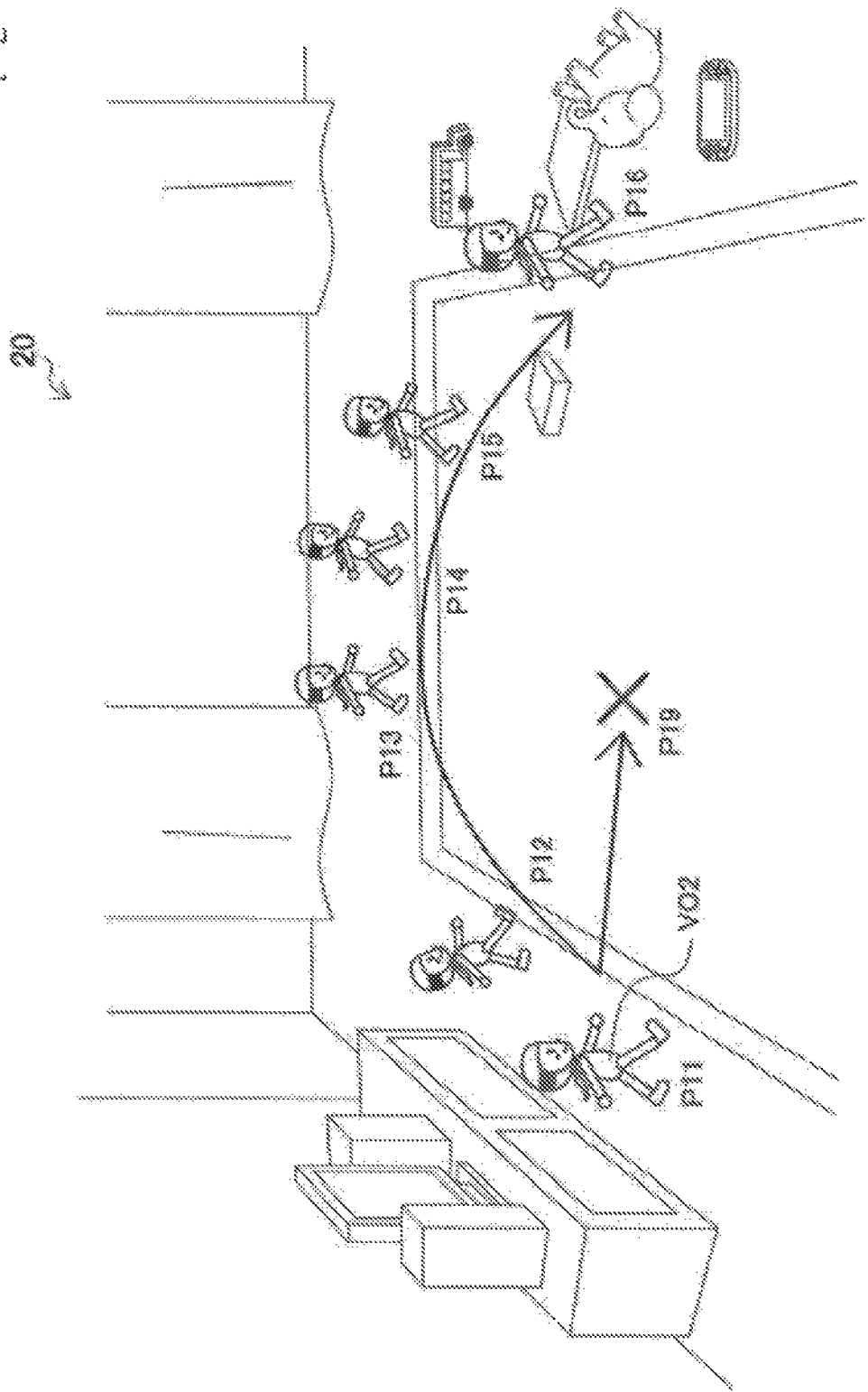

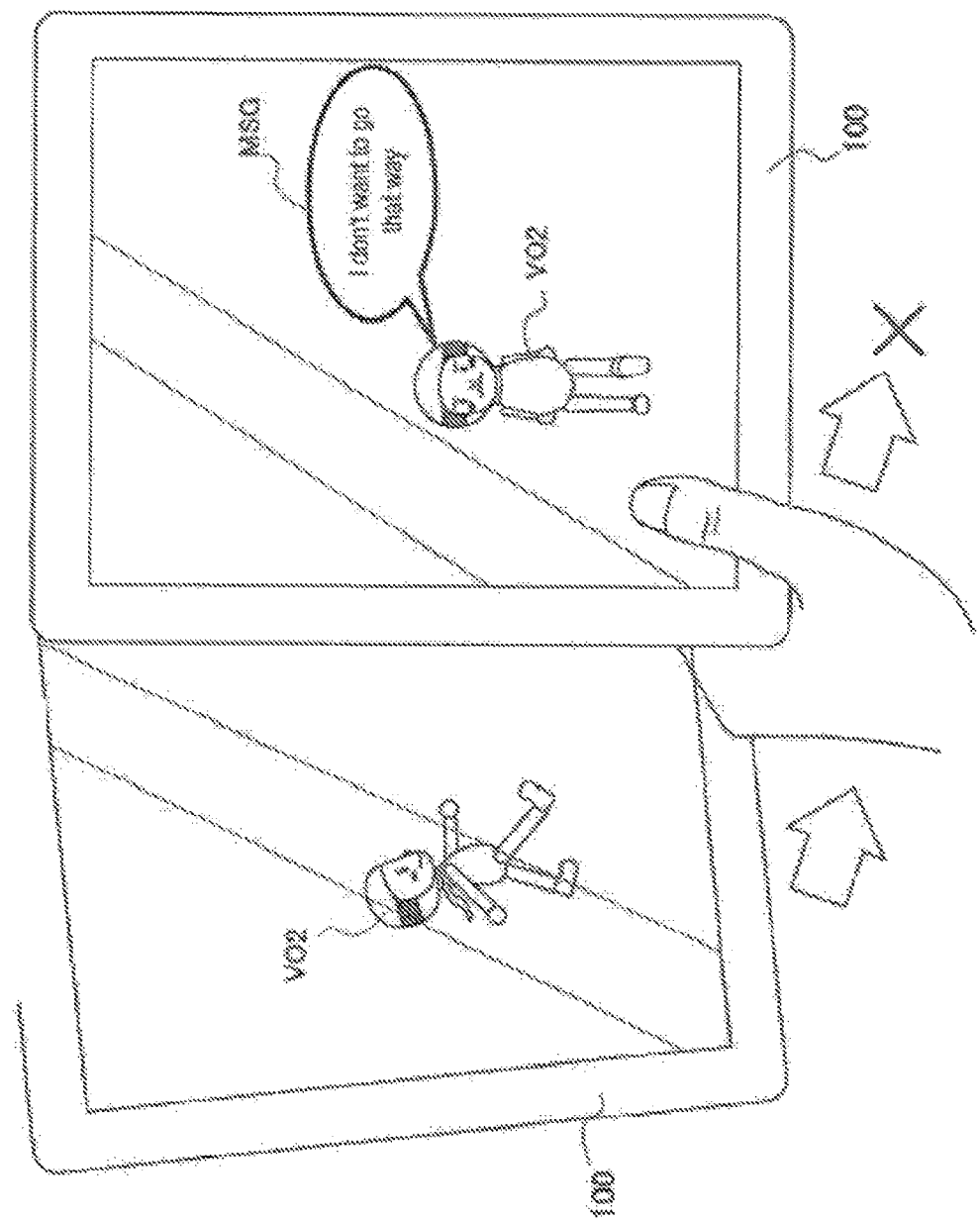

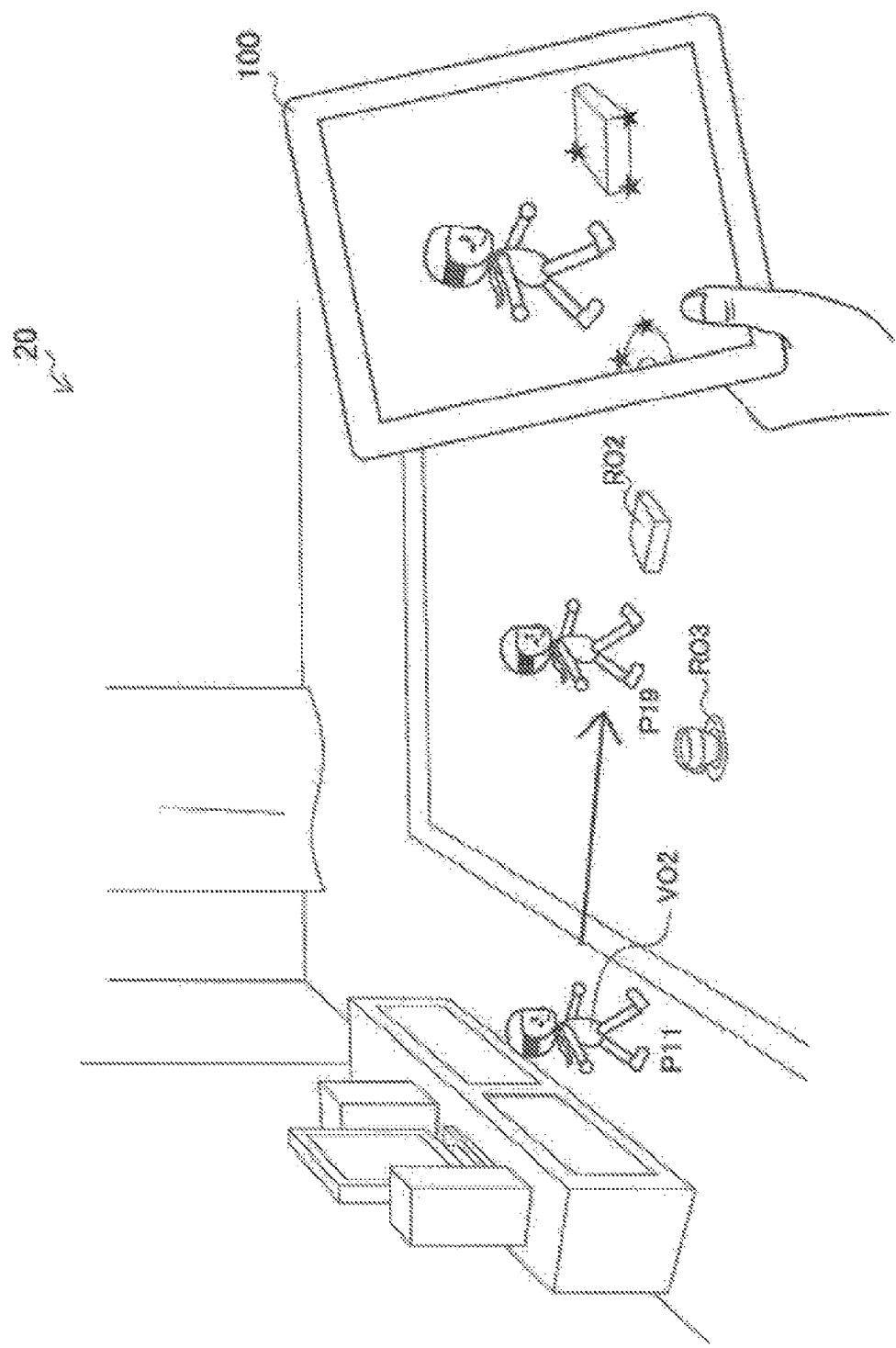

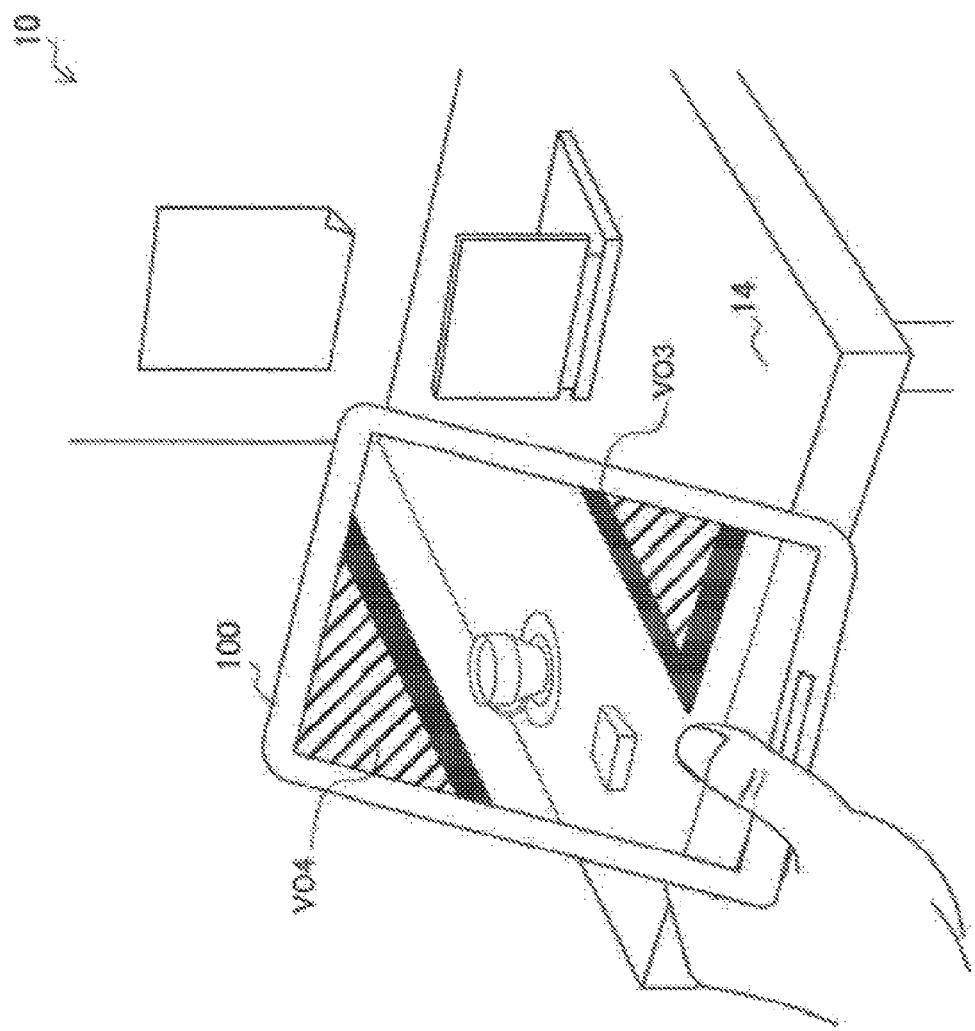

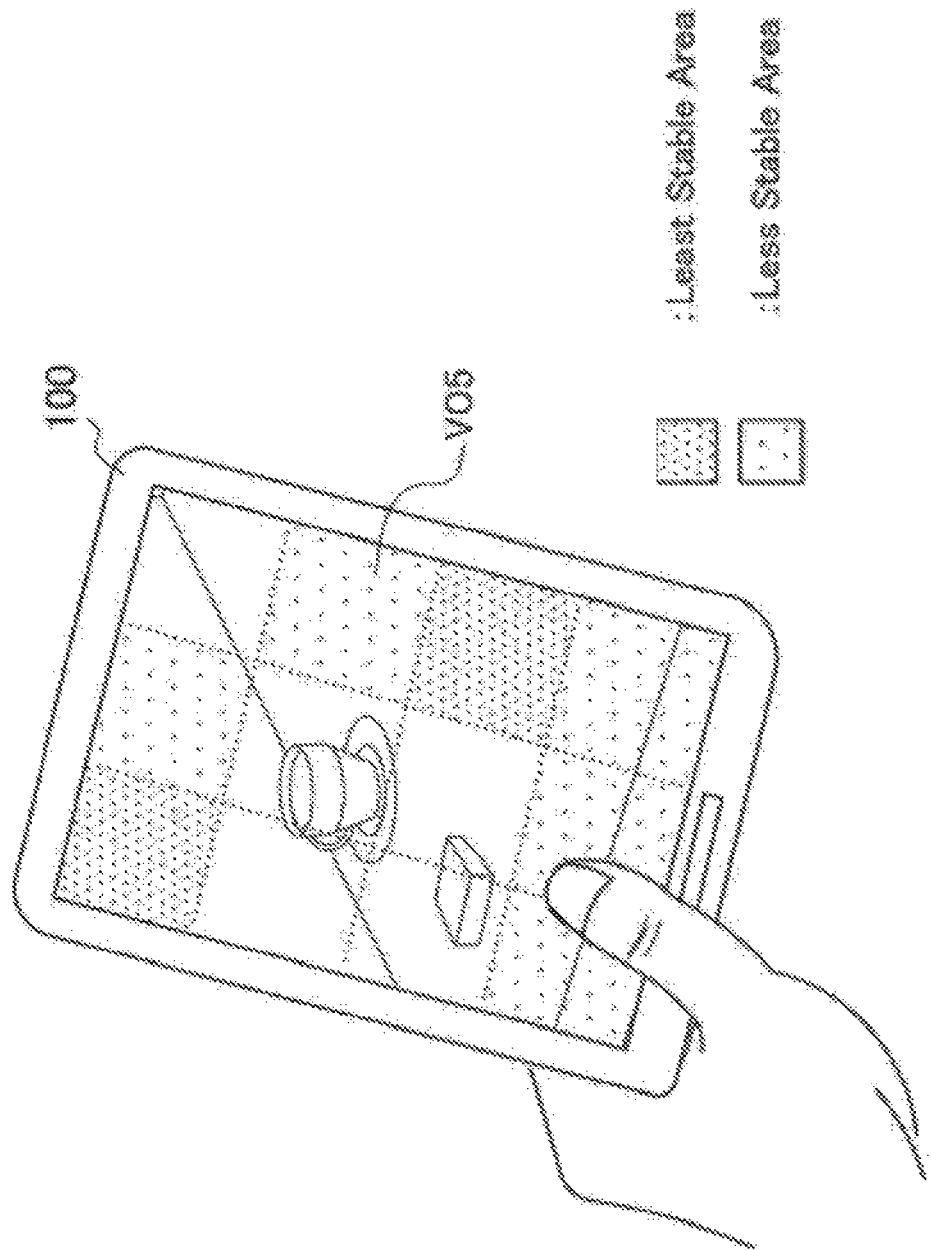

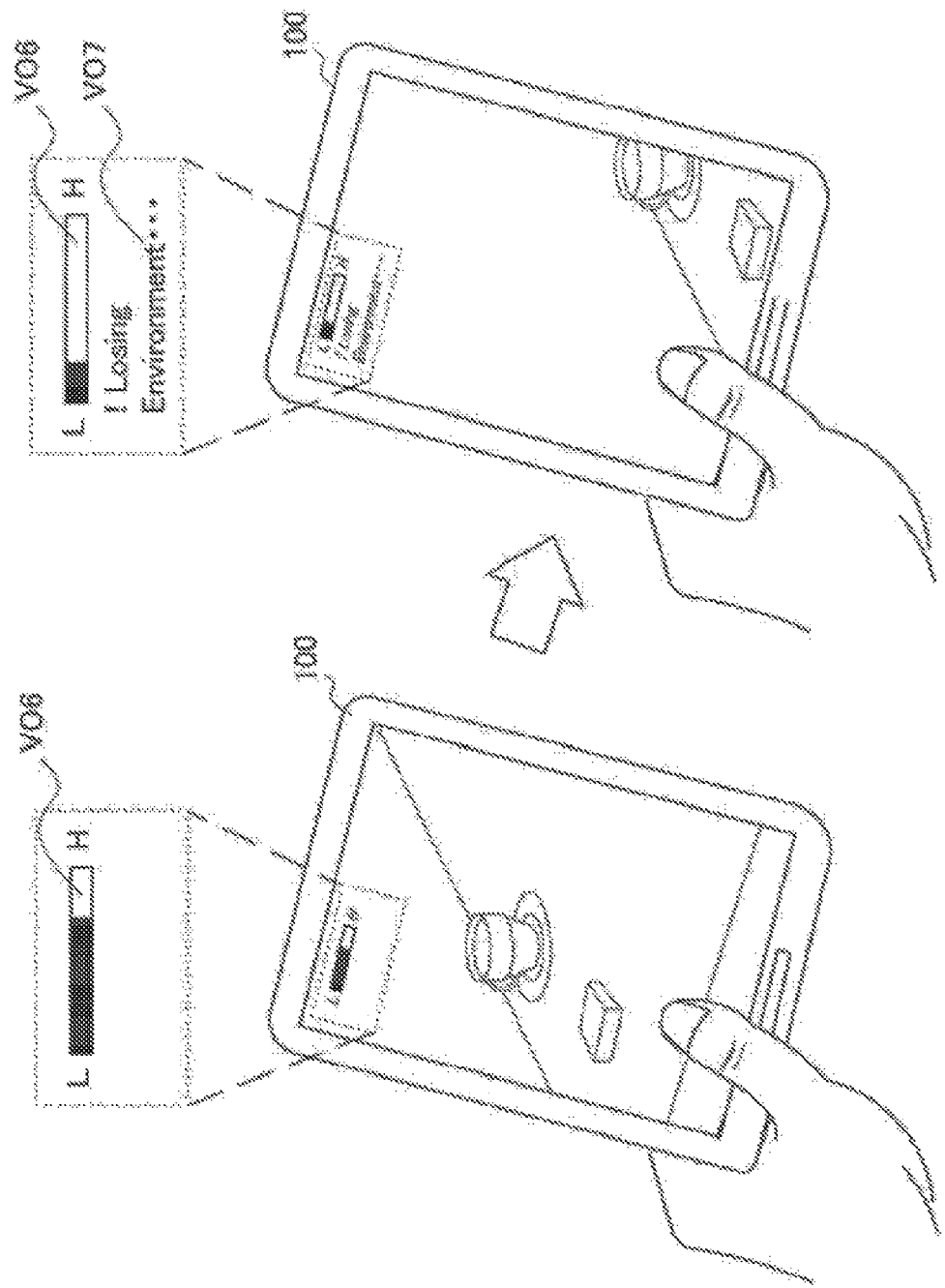

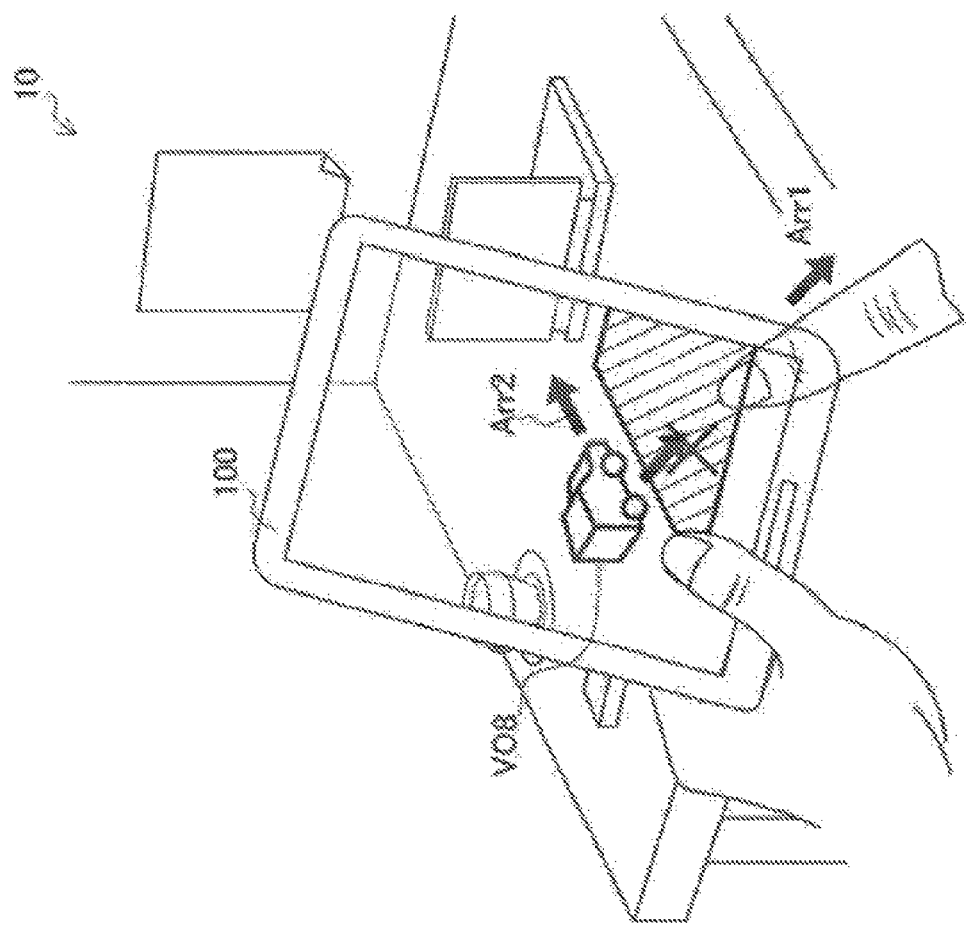

[Fig. 20]
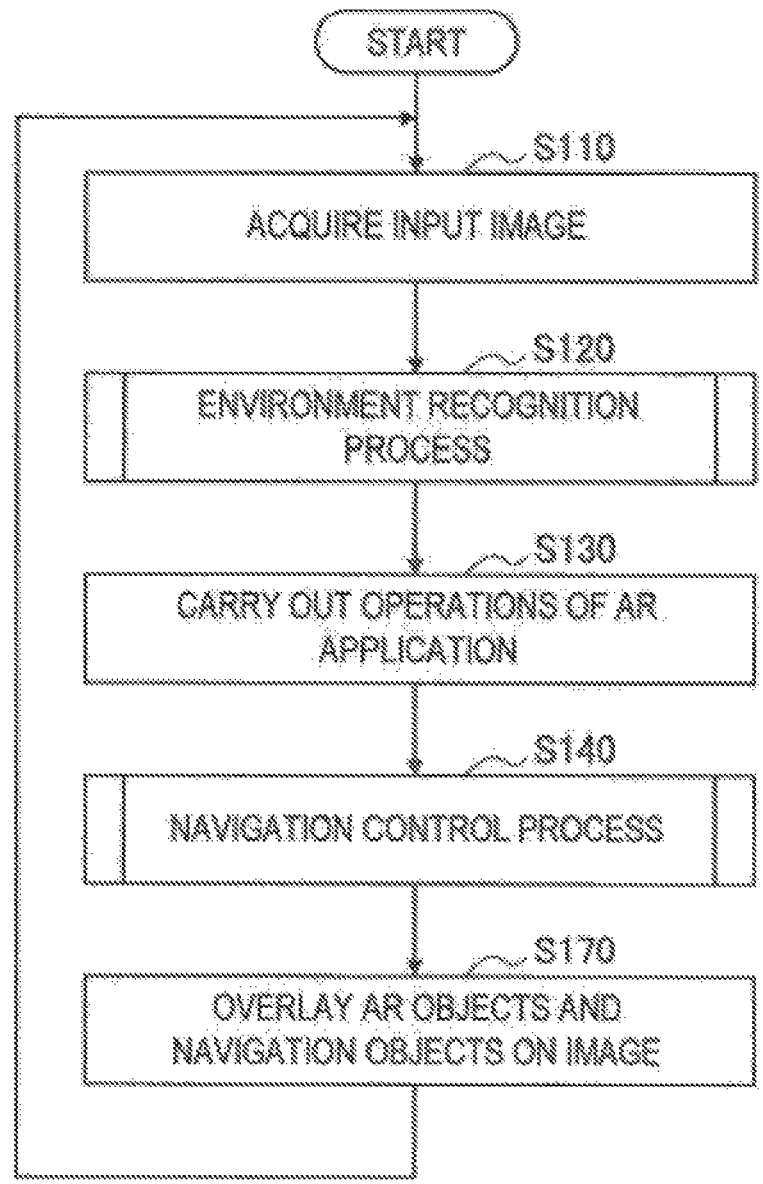

[Fig. 21]
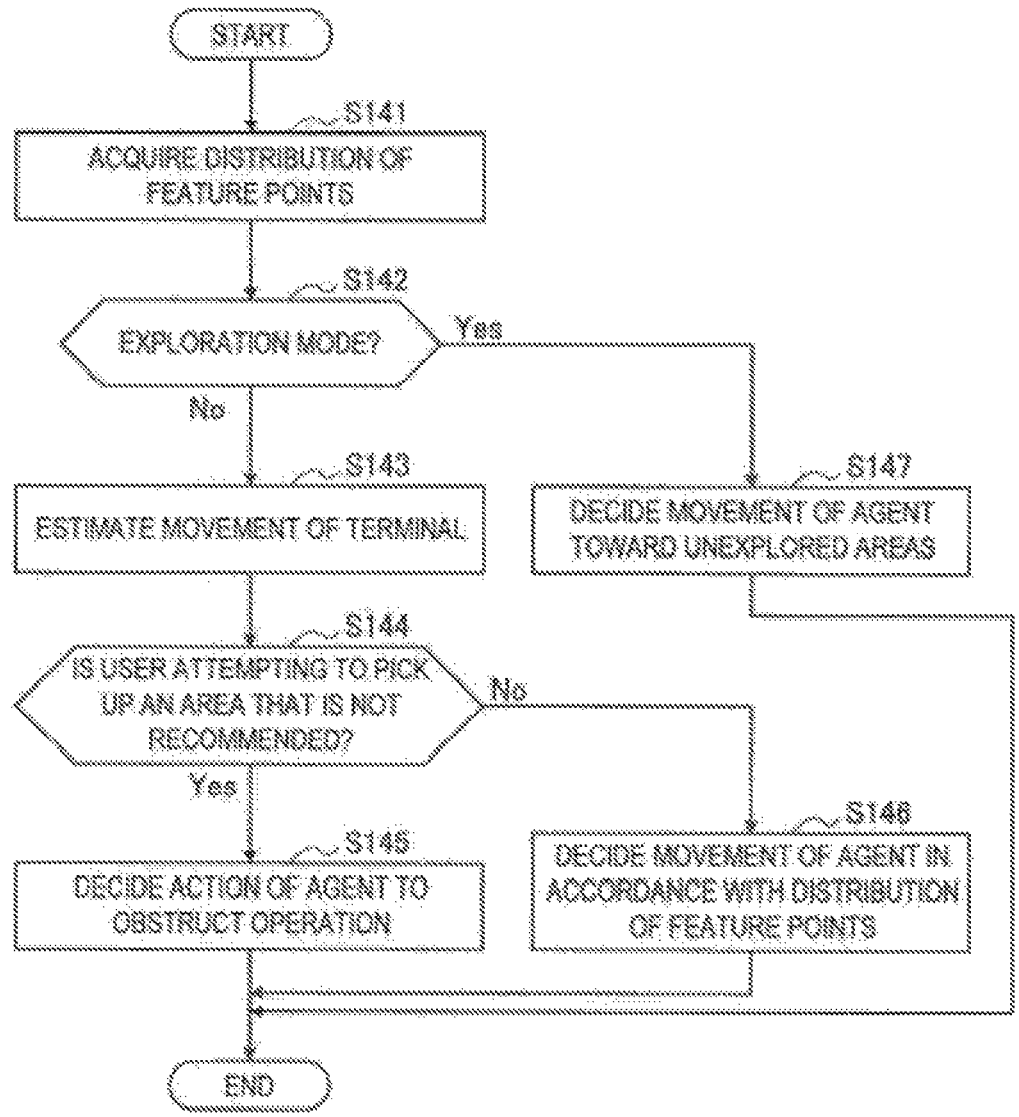

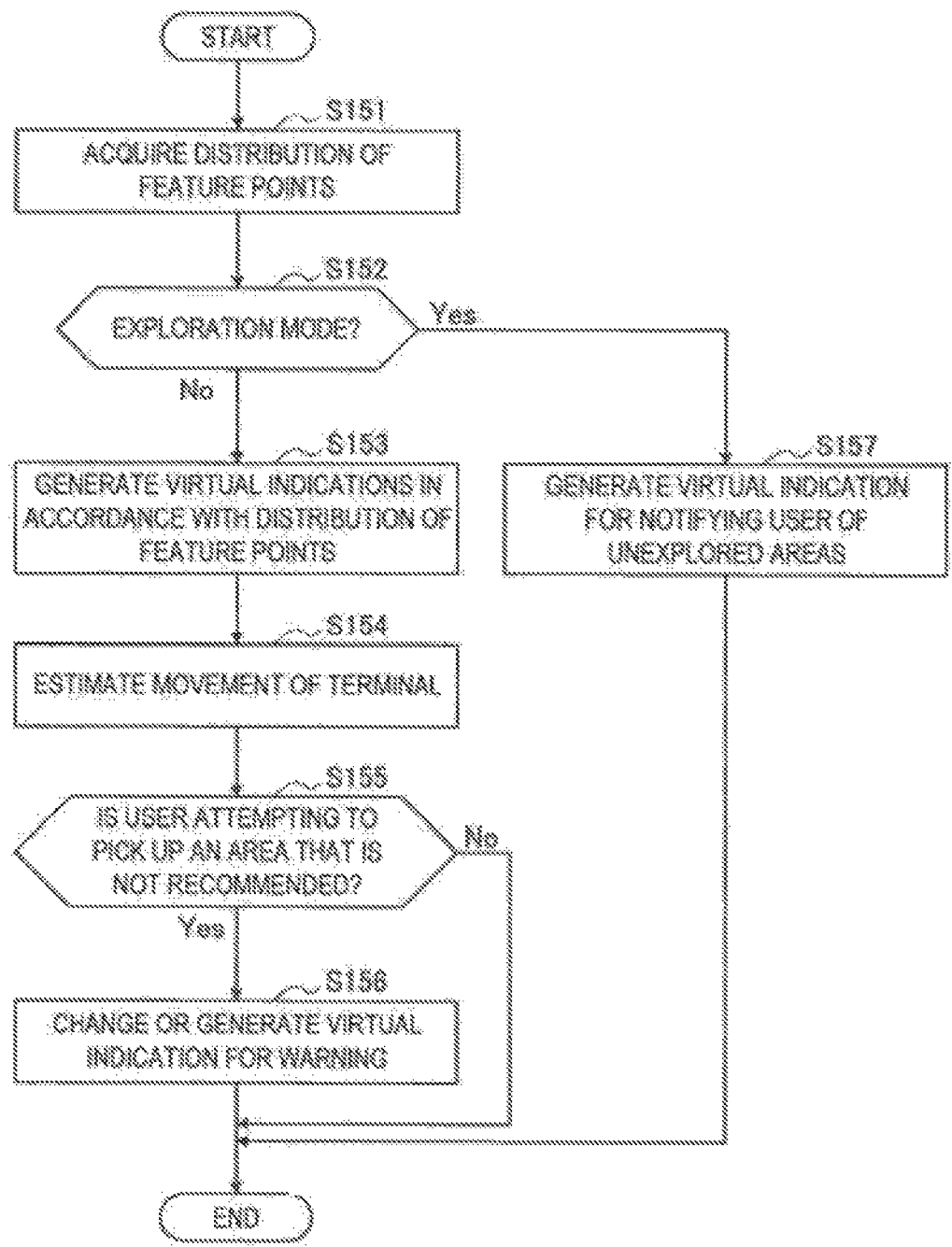
[Fig. 22]

[Fig. 23]
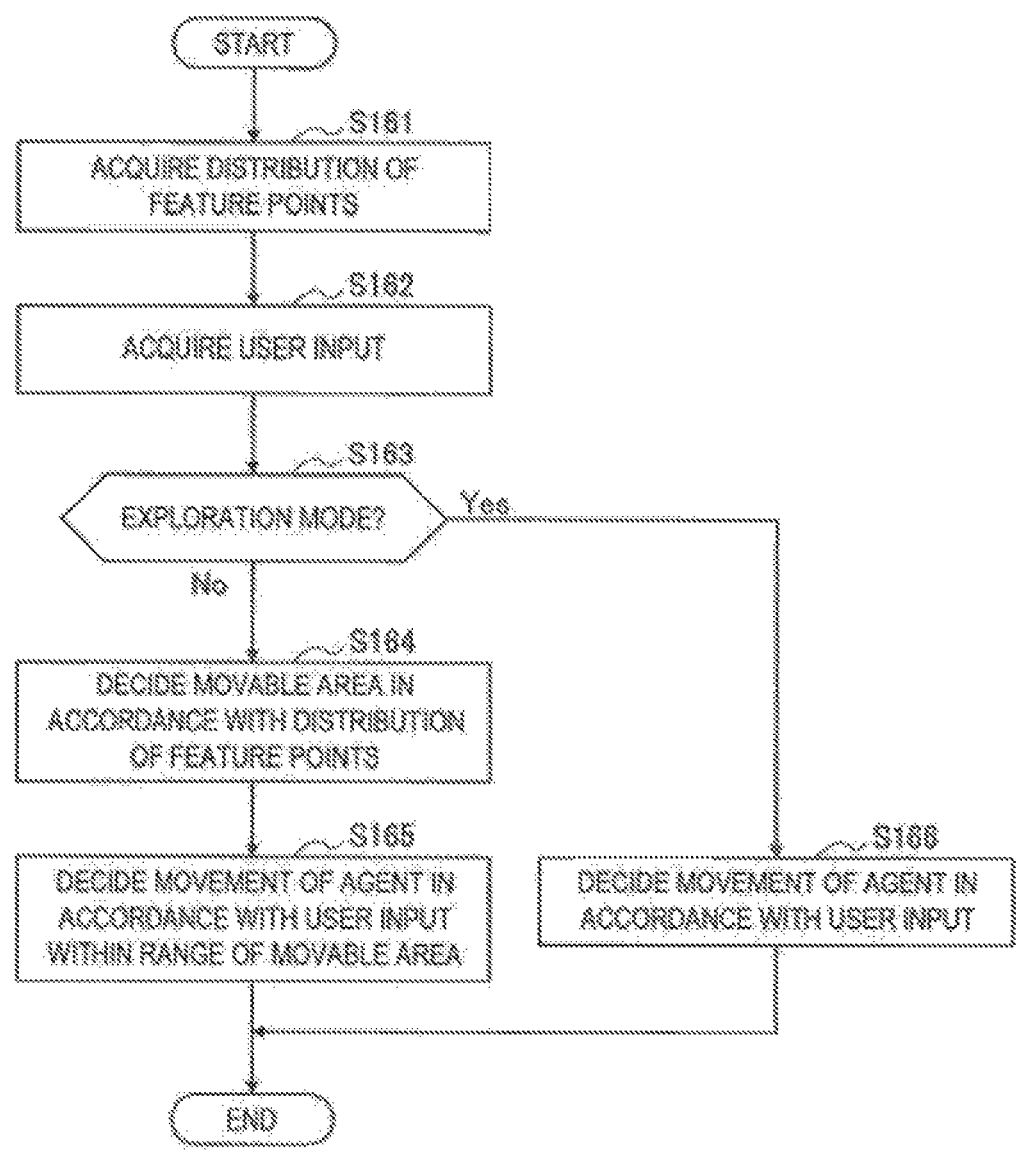

IMAGE PROCESSING TO PROVIDE STABLE ENVIRONMENT RECOGNITION

The present application is a continuation application of U.S. patent application Ser. No. 15/162,246, filed on May 23, 2016 which is a continuation application of U.S. patent application Ser. No. 14/391,874, filed on Oct. 10, 2014, which is a National Stage of PCT/JP2013/002059 filed on Mar. 26, 2013 and claims the benefit of priority from prior Japanese Patent Application JP 2012-097714 filed in the Japan Patent Office on Apr. 23, 2012, the entire content of which is hereby incorporated by reference.

TECHNICAL FIELD

The present disclosure relates to an image processing apparatus, an image processing method, and a program.

BACKGROUND ART

In recent years, attention has been focused on a technology called augmented reality (AR) that presents additional information to the user by overlaying such information onto a real space. The information presented to the user by AR technology is also referred to as annotations and may be visualized using virtual objects in a variety of forms, such as text, icons, and animations. The laying out of annotations in an AR space is normally carried out based on recognition of the three-dimensional structure of a real space appearing in an image (hereinafter referred to as "environment recognition"). Known methods of environment recognition include SLAM (Simultaneous Localization And Mapping) and SfM (Structure from Motion), for example. The fundamental principles of SLAM are described in NPL 1 indicated below. According to SLAM, a set of feature points that are dynamically updated in keeping with changes in input images are used to simultaneously carry out recognition of the positions of feature points and recognition of the position and posture of the camera in the environment. With SfM, parallax is calculated from the positions of feature points appearing in a plurality of images picked up while the viewpoint changes and the environment is recognized based on the calculated parallax. PTL 1 discloses a method where the three-dimensional position of a feature point selected during initialization of SLAM is recognized using SfM. PTL 2 discloses an example of an AR application that may be realized by applying SLAM.

CITATION LIST

Patent Literature

[PTL 1]
JP 2009-237845A
[PTL 2]
JP 2011-159162A

Non Patent Literature

[NPL 1]
Andrew J. Davison, "Real-Time Simultaneous Localization and Mapping with a Single Camera", Proceedings of the 9th IEEE International Conference on Computer Vision Volume 2, 2003, pp. 1403-1410.

SUMMARY

Technical Problem

The precision of environment recognition technology based on a set of feature points in an image depends on the distribution of the feature points in the image. As the number of feature points increases, so does the stability of recognition. If the number of feature points is too low, it can become no longer possible to track the environment. Also, when the number of feature points in images is the same, the greater the biasing of the distribution of feature points, the more unstable recognition becomes. However, a user who uses an AR application will normally have no knowledge of such characteristics of environment recognition technology. Accordingly, when providing an AR application to users, there is the real risk of a situation where the environment recognition becomes unstable and hinders use of the AR application due to the user pointing a terminal (or camera) in a direction that is unfavorable for environment recognition technology.

Accordingly, when providing an AR application to users, it would be desirable to provide a framework capable of avoiding the situation described above.

Solution to Problem

According to a first exemplary embodiment, the disclosure is directed to an information processing system comprising: circuitry configured to: acquire image data captured by an image capturing device; identify a density of distribution of a plurality of feature points in the acquired image data; and control a display to display guidance information based on the density of the distribution of the plurality of feature points.

According to another exemplary embodiment, the disclosure is directed to an information processing method comprising: acquiring image data captured by an image capturing device; identifying a density of distribution of a plurality of feature points in the acquired image data; and controlling a display to display guidance information based on the density of the distribution of the plurality of feature points.

According to another exemplary embodiment, the disclosure is directed to a non-transitory computer-readable medium including computer program instructions, which when executed by circuitry, causes the circuitry to perform: acquiring image data captured by an image capturing device; identifying a density of distribution of a plurality of feature points in the acquired image data; and controlling a display to display guidance information based on the density of the distribution of the plurality of feature points.

Advantageous Effects of Invention

According to the above embodiments of the present disclosure, it is possible, when providing an AR application to a user, to avoid a situation where environment recognition becomes unstable and hinders use of the AR application.

BRIEF DESCRIPTION OF DRAWINGS

FIG. 1 is a diagram useful in explaining an overview of an image processing apparatus according to an embodiment of the present disclosure.

FIG. 2 is a diagram useful in explaining feature points used for environment recognition FIG. 3 is a diagram useful in explaining the relationship between a distribution of feature points and stability of environment recognition.

FIG. 4 is a block diagram showing one example of the hardware configuration of an image processing apparatus according to the present embodiment.

FIG. 5 is a block diagram showing an example of the configuration of logical functions of the image processing apparatus 100 according to the present embodiment.

FIG. 6 is a flowchart showing one example of the flow of a SLAM computation process carried out by a SLAM computation unit illustrated in FIG. 5.

FIG. 7 is a diagram useful in explaining feature points set on a real object.

FIG. 8 is a diagram useful in explaining addition of feature points.

FIG. 9 is a diagram useful in explaining one example of a prediction model.

FIG. 10 is a diagram useful in explaining one example of the composition of the feature data.

FIG. 11 is a diagram useful in explaining a first method of deciding the navigation direction in accordance with the distribution of feature points.

FIG. 12 is a diagram useful in explaining a second method of deciding the navigation direction in accordance with the distribution of feature points.

FIG. 13 is a diagram useful in explaining a first example of navigation by an autonomous operation agent.

FIG. 14 is a diagram useful in explaining a second example of navigation by an autonomous operation agent.

FIG. 15 is a diagram useful in explaining a third example of navigation by an autonomous operation agent.

FIG. 16 is a diagram useful in explaining a first example of navigation by virtual indications.

FIG. 17 is a diagram useful in explaining a second example of navigation by virtual indications.

FIG. 18 is a diagram useful in explaining a third example of navigation by virtual indications.

FIG. 19 is a diagram useful in explaining an example of navigation by a user-operated agent.

FIG. 20 is a flowchart showing one example of the overall flow of image processing according to the present embodiment.

FIG. 21 is a flowchart showing one example of the flow of a navigation control process when an autonomous operation agent is used.

FIG. 22 is a flowchart showing an example of the flow of the navigation control process in a case where virtual indications are used.

FIG. 23 is a flowchart showing an example of the flow of the navigation control process in a case where a user-operated agent is used.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview
2. Configuration of Apparatus according to an Embodiment
  2-1. Hardware Configuration
  2-2. Functional Configuration
  2-3. Example of Navigation
  2-4. Flow of Processing
3. Conclusion 1. Overview An overview of embodiments of the present disclosure will be given first with reference to FIGS. 1 to 3.

FIG. 1 is a diagram useful in explaining an overview of an image processing apparatus 100 according to an embodiment of the present disclosure. In FIG. 1, the image processing apparatus 100 that is held by a user Ua is shown. The image processing apparatus 100 includes an image pickup unit 102 with a lens that is pointed toward a real space 10 and a display unit 110. In the example in FIG. 1, a variety of real objects including a table 14 are present in the real space 10. The image pickup unit 102 of the image processing apparatus 100 picks up images of the real space 10. Such picked-up images may be displayed on the display unit 110. The image processing apparatus 100 may include a control unit (not shown) that has an AR application carried out. Such AR application receives an image picked up by the image pickup unit 102 as an input image, overlays virtual objects onto such image, and outputs the result to the display unit 110. In the example in FIG. 1, a virtual object VO1 is overlaid in an output image Im01 so that the virtual object VO1 appears just as if it were present on the table 14.

In FIG. 1, a mobile terminal is shown as one example of the image processing apparatus 100. However, the image processing apparatus 100 is not limited to such example. As other examples, the image processing apparatus 100 may be a PC (Personal Computer), a PDA (Personal Digital Assistant), a smartphone, a game terminal, a PND (Portable Navigation Device), a content player, or a digital home appliance. Also, instead of running on the terminal operated by the user, the AR application may run on another apparatus (such as an application server) that is capable of communicating with the terminal.

To appropriately overlay virtual objects onto images in an AR application, it is important to recognize the position and posture of the terminal (especially the image pickup unit 102) relative to the real space with at least a certain level of precision. As technologies for such environment recognition, technologies based on a set of feature points in an image are known. As one example, according to SLAM, a set of feature points that are dynamically updated in keeping with changes in input images are used to simultaneously carry out recognition of the positions of feature points and recognition of the position and posture of the camera in the environment. With SfM, parallax is calculated from the positions of feature points appearing in a plurality of images picked up while the viewpoint changes and the environment is recognized based on the calculated parallax.

However, the precision of environment recognition based on a set of feature points in an image depends on the distribution of the feature points. As the number of feature points increases, so does the stability of recognition. If the number of feature points is too low, it can become no longer possible to track the environment and it becomes difficult to decide where to overlay the virtual objects. Also, when the number of feature points in images is the same, the greater the biasing of the distribution of feature points, the more unstable recognition becomes, resulting in hinderances such as irregular movement of the virtual objects.

FIG. 2 is a diagram useful in explaining feature points used for environment recognition. FIG. 2 again shows the real space 10 that was illustrated in FIG. 1. The star symbols in FIG. 2 express points that have a high probability of being detected as feature points in the real space 10. As can be understood from the drawing, no feature points are present in areas 12a and 12b. Accordingly, if for example an input image is picked up so that only area 12a or area 12b appears in the entire image, this will result in a situation where environment recognition fails and an AR application does not operate normally.

The relationship between the distribution of feature points and the stability of environment recognition will now be described further with reference to FIG. 3. In FIG. 3, an abstraction of the real space 10 is shown in the circular frame and feature points in the real space 10 are indicated by star symbols. Here, assume that the present camera angle is pointed toward the center of the circular frame. A large number of feature points appear in the image Im10 picked up at this time, with such feature points being distributed comparatively uniformly across the entire image. Accordingly, by using the image Im10, it is possible to recognize the environment with comparatively high stability. If, after this, the user moves the camera angle upward, an image Im11 will be picked up. If the user moves the camera angle downward, an image Im12 will be picked up. In both the image Im11 and the image Im12, a plurality of feature points are distributed comparatively uniformly across the entire image. Conversely, if the user moves the camera angle to the left, an image Im13 will be picked up. No feature points appear in the image Im13. In this case, environment recognition is likely to fail. Also, if the user moves the camera angle to the right, an image Im14 is picked up. Although a plurality of feature points appear in image Im14, such feature points are biased toward the upper part of the image. In this case, environment recognition may become unstable (for the example of the image Im14, although the posture (rotational angle) of the camera in the yaw direction may be decided with sufficient precision, sufficient precision is not achieved for the posture of the camera in the pitch direction). Accordingly, for an AR application that uses an environment recognition technology based on a set of feature points, it is more preferable for the user to move the camera angle in the up direction or the down direction rather than moving the camera angle to the left or to the right.

For this reason, as described in detail below, the following embodiment of the disclosure provides a navigation framework for navigating the user of an AR application so as to stabilize environment recognition that is based on a set of feature points.

2. Configuration of Apparatus According to an Embodiment

An example configuration of the image processing apparatus 100 according to the present embodiment will now be described. This explanation will focus on an example where the position and posture of a terminal relative to a real space are recognized using SLAM. However, the embodiment described below is not limited to such example and may be combined with any other technology that carries out environment recognition based on a set of feature points.

2-1. Hardware Configuration

FIG. 4 is a block diagram showing one example of the hardware configuration of the image processing apparatus 100 according to an embodiment. As shown in FIG. 4, the image processing apparatus 100 includes the image pickup unit 102, a sensor unit 104, an input unit 106, a storage unit 108, a display unit 110, a communication unit 112, a bus 116, and a control unit 118.

(1) Image Pickup Unit

The image pickup unit 102 is a camera module that picks up an image. The image pickup unit 102 picks up images of a real space using an image pickup element such as a CCD (Charge Coupled Device) or a CMOS (Complementary Metal Oxide Semiconductor) to generate a picked-up image. The picked-up images generated by the image pickup unit 102 are used as input images for image processing by the control unit 118. Note that the image pickup unit 102 does not need to be part of the image processing apparatus 100. As one example, an image pickup apparatus connected to the image processing apparatus 100 wirelessly or using wires may be treated as the image pickup unit 102.

(2) Sensor Unit

The sensor unit 104 may include a variety of sensors such as a positioning sensor, an acceleration sensor, and a gyro sensor. Measurement results obtained by the sensor unit 104 may be used in a variety of applications, such as supporting environment recognition, acquiring data that is specific to a geographic position, and detecting a user input. Note that the sensor unit 104 may be omitted from the configuration of the image processing apparatus 100.

(3) Input Unit

The input unit 106 is an input device used by the user to operate the image processing apparatus 100 or to input information into the image processing apparatus 100. As one example, the input unit 106 may include a touch sensor that detects touches made by the user on the screen of the display unit 110. In place of (or in addition to) this, the input unit 106 may include a pointing device such as a mouse or a touch pad. In addition, the input unit 106 may include another type of input device such as a keyboard, a keypad, a button or buttons, or a switch or switches.

(4) Storage Unit

The storage unit 108 is constructed of a storage medium such as a semiconductor memory or a hard disk drive and stores programs and data for processing by the image processing apparatus 100. The data stored by the storage unit 108 may include picked-up image data, sensor data, and data in a variety of databases (DB), described later. Note that instead of being stored in the storage unit 108, some of the programs and data described in the present specification may be acquired from an external data source (as examples, a data server, network storage, or an external memory).

(5) Display Unit

The display unit 110 is a display module including a display such as an LCD (Liquid Crystal Display), an OLED (Organic Light-Emitting Diode), or a CRT (Cathode Ray Tube). As one example, the display unit 110 is used to display an image of AR application generated by the image processing apparatus 100. Note that the display unit 110 also does not need to be part of the image processing apparatus 100. As one example, a display apparatus connected to the image processing apparatus 100 wirelessly or using wires may be treated as the display unit 110.

(6) Communication Unit

The communication unit 112 is a communication interface that serves as a mediator for communication by the image processing apparatus 100 with other apparatuses. The communication unit 112 supports an arbitrary wireless communication protocol or wired communication protocol and establishes a communication connection with other apparatuses.

(7) Bus

The bus 116 connects the image pickup unit 102, the sensor unit 104, the input unit 106, the storage unit 108, the display unit 110, the communication unit 112, and the control unit 118 to one another.

(8) Control Unit

The control unit 118 corresponds to a processor such as a CPU (Central Processing Unit) or a DSP (Digital Signal Processor). By executing a program stored in the storage unit 108 or another storage medium, the control unit 118 causes the image processing apparatus 100 to function in a variety of ways as described later.

2-2. Functional Configuration

FIG. 5 is a block diagram showing an example of the configuration of the logical functions realized by the storage unit 108 and the control unit 118 of the image processing apparatus 100 shown in FIG. 4. As shown in FIG. 5, the image processing apparatus 100 includes an image acquiring unit 120, a data acquiring unit 125, a recognizing unit 130, a map database (DB) 160, a map management unit 165, an application unit 170, and a display control unit 180.

(1) Image Acquiring Unit

The image acquiring unit 120 acquires picked-up images generated by the image pickup unit 102 as input images. The input images acquired by the image acquiring unit 120 are images in which a real space appears. The input images are typically individual frames that construct video. The image acquiring unit 120 outputs the acquired input images to the recognizing unit 130 and the display control unit 180.

(2) Data Acquiring Unit

The data acquiring unit 125 acquires data to be used in environment recognition by the recognizing unit 130 and in provision of an AR application by the application unit 170. As examples, the data acquiring unit 125 may acquire sensor data generated by the sensor unit 104, data relating to real objects, and data relating to virtual objects.

(3) Slam Computation Unit

The recognizing unit 130 recognizes the position and posture of the image pickup unit 102 relative to the real space based on the position(s) of at least one feature point appearing in the input images acquired by the image acquiring unit 120. In the present embodiment, the recognizing unit 130 includes a SLAM computation unit 135, an object DB 140, and an image recognizing unit 145.

The SLAM computation unit 135 carries out computation according to SLAM to dynamically recognize the three-dimensional structure of a real space appearing in an input image from a monocular camera and recognize the position and posture of the image pickup unit 102.

First, the overall flow of the SLAM computation process carried out by the SLAM computation unit 135 will be described with reference to FIG. 6. After that, the SLAM computation process will be described in detail with reference to FIGS. 7 to 10.

FIG. 6 is a flowchart showing one example of the flow of the SLAM computation process carried out by the SLAM computation unit 135. In FIG. 6, when the SLAM computation process starts, the SLAM computation unit 135 first carries out an initialization process to initialize a state variable (step S10). In the present embodiment, the expression "state variable" refers to a vector including the position and posture (rotational angle) of the camera, the movement velocity and angular velocity of the camera, and the position of at least one feature point as elements. Input images acquired by the image acquiring unit 120 are successively inputted into the SLAM computation unit 135 (step S20). The processing from step S30 to step S50 may be repeated for each input image (that is, for each frame).

In step S30, the SLAM computation unit 135 tracks the feature points appearing in the input image. For example, the SLAM computation unit 135 matches a new input image against a patch (for example, a small image of 3×3=9 pixels centered on a feature point) for each feature point acquired in advance. The SLAM computation unit 135 then detects the positions of the patches in the input image, that is, the positions of the feature points. The positions of the feature points detected here are used later when updating the state variable.

In step S40, the SLAM computation unit 135 generates a predicted value for the state variable in the next frame, for example, based on a specified prediction model. Also, in step S50, the SLAM computation unit 135 uses the predicted value of the state variable generated in step S40 and observed values in keeping with the positions of the feature points detected in step S30 to update the state variable. The SLAM computation unit 135 carries out the processing in steps S40 and S50 based on the principles of an extended Kalman filter.

As a result of such processing, values of the state variable that is updated in each frame are outputted. The respective processing contents of the initialization of the state variable (step S10), the tracking of feature points (step S30), the prediction of the state variable (step S40), and the updating of the state variable (step S50) will now be described in more detail.

(3-1) Initialization of State Variable

Out of the elements of the state variable used by the SLAM computation unit 135, the initial values of the position, posture, movement velocity, and angular velocity of the camera may be zero or any other values. Also, a plurality of feature points are selected from an input image. As examples, the feature points selected here may be points that are dynamically detected in an image (for example, edges and corners of textures), or may be known points set in advance for initialization purposes. The three-dimensional positions of the feature points may also be calculated in accordance with a method such as SfM. The SLAM computation unit 135 uses such initialized elements to construct the state variable.

(3-2) Tracking of Feature Points

The tracking of the feature points is carried out using patch data for at least one feature point that appears on the external appearance of a real object that may be present in a real space. In FIG. 8, a chest (on the left in the drawing) and a calendar (on the right in the drawing) are shown as two examples of real objects. At least one feature point (FP) is set on each real object. As one example, feature point FP1 is a feature point set on the chest and a patch Pth1 associated with the feature point FP1 is defined. In the same way, feature point FP2 is a feature point set on the calendar and a patch Pth2 associated with the feature point FP2 is defined.

The SLAM computation unit 135 matches the patch data of the feature points selected in the initialization process or patch data of feature points that are newly selected afterwards against partial images included in the input image. As a result of such matching, the SLAM computation unit 135 specifies the positions of feature points included in the input image (for example, the positions of center pixels of the detected patches).

One characteristic of SLAM is that the tracked feature points dynamically change over time. For example, in the example in FIG. 8, when time T=t−1, six feature points are detected in the input image. Next, if the position or posture of the camera changes at time T=t, only two out of the six feature points that appeared in the input image at time T=t−1 appear in the input image. In this case, the SLAM computation unit 135 may set new feature points with a characteristic pixel pattern in the input image and use such new feature points in a SLAM computation process in a following frame. As one example, for the case shown in FIG. 8, at time T=t, four new feature points are set on the real objects. By using this characteristic of SLAM, it is possible to reduce the necessary cost when setting feature points in advance and to raise the recognition precision by using the increased large number of feature points.

(3-3) Prediction of State Variable

In the present embodiment, the SLAM computation unit 135 uses a state variable X expressed in the following equation as the state variable to be applied for the extended Kalman filter.

[Math. 1]

$$X = \begin{pmatrix} x \\ \omega \\ \dot{x} \\ \dot{\omega} \\ p_1 \\ \vdots \\ p_N \end{pmatrix}$$

(1)

As shown in the following equation, the first element of the state variable X in Equation (1) expresses the three-dimensional position of the camera in the real space.

[Math. 2]

$$X = \begin{pmatrix} x_c \\ y_c \\ z_c \end{pmatrix}$$

(2)

The second element of the state variable is a four-dimensional vector that has a quaternion corresponding to a rotation matrix expressing the posture of the camera as elements. Note that in place of a quaternion, the posture of the camera may be expressed using a Euler angle. Also, the third and fourth elements of the state variables respectively express the movement velocity and the angular velocity of the camera.

In addition, the fifth and subsequent elements of the state variable respectively each express the three dimensional position $p_i$ of a feature point $FP_i$ (where i=1 ... N). Note that as described earlier the number N of feature points may change during processing.

[Math. 3]

$$p_i = \begin{pmatrix} x_i \\ y_i \\ z_i \end{pmatrix}$$

(3)

The SLAM computation unit 135 generates a predicted value of the state variable for the latest frame based on the value of the state variable X initialized in step S10 or the value of the state variable X updated in a previous frame. The predicted value of the state variable is generated in accordance with a state equation of the extended Kalman filter in accordance with the multidimensional normal distribution shown in the following equation.

[Math. 4]

$$\text{Predicted state variable } \hat{C} = F(X,a) + w \quad (4)$$

Here, F is a prediction model relating to state transitions of the system and a is a prediction condition. w is Gaussian noise and as examples may include a model approximation error and an observation error. The average of the Gaussian noise w will normally be zero.

FIG. 9 is a diagram useful in explaining an example of a prediction model according to the present embodiment. As shown in FIG. 9, there are two prediction conditions in the prediction model according to the present embodiment. First, as the first condition, it is assumed that the three-dimensional position of a feature point does not change. That is, if the three-dimensional position of the feature point FP1 at time T is expressed as $p_T$, the following relationship is satisfied.

[Math. 5]

$$P_t = P_{t-1} \quad (5)$$

Next, as the second condition, it is assumed that the movement of the camera is uniform motion. That is, the following relationship is satisfied for the velocity and angular velocity of the camera from time T=t−1 to time T=t.

[Math. 6]

$$\dot{X}_t = \dot{X}_{t-1} \quad (6)$$

$$\dot{\omega}_t = \dot{\omega}_{t-1} \quad (7)$$

Based on the prediction model and the state equation shown in Equation (4), the SLAM computation unit 135 generates a predicted value of the state variable for the latest frame.

(3-4) Updating of State Variable

The SLAM computation unit 135 then uses an observation equation to evaluate the error between for example the observation information predicted from the predicted value of the state variable and the actual observation information obtained as a result of tracing the feature points. Nu in Equation (8) below is such error.

[Math. 7]

$$\text{Observation information } s = H(\hat{X}) + v \quad (8)$$

$$\text{Predicted observation information } \hat{s} = H(\hat{X}) \quad (9)$$

Here, H represents an observation model. For example, the position of the feature point $FP_i$ on an image pickup plane (u-v plane) is defined by the following equation.

[Math. 8]

Position of feacher point FPi on image pickup plane $$\tilde{P}_i = \begin{pmatrix} u_i \\ v_i \\ 1 \end{pmatrix}$$

(10)

Here, the position x of the camera, the posture omega of the camera, and the three-dimensional position $p_i$ of a feature point $FP_i$ are all provided as elements of the state variable X. By doing so, the position on an image pickup plane of the feature point $FP_i$ is found in accordance with a pinhole camera model using the following equation. Note that lambda is a parameter for normalization, A is a camera internal parameter matrix, and R with subscript omega is a rotation matrix corresponding to the quaternion omega representing the posture of the camera included in the state variable X.

[Math. 9]

$$\lambda \tilde{P}_i = AR_\omega(p_i-x) \quad (11)$$

Accordingly, by searching for a state variable X that minimizes the error between the predicted observation information derived using Equation (11), that is, the positions on the image pickup plane of the respective feature points, and the result of tracking the feature points in step S30 in FIG. 6, it is possible to obtain a feasible, up-to-date state variable X.

[Math. 10]

$$\text{Latest State Variable } X \leftarrow \hat{X} + \text{Innov}(s-\hat{s}) \quad (12)$$

The SLAM computation unit 135 outputs the values of the parameters included in the state variable X dynamically updated in this way according to SLAM to the map management unit 165 and has such values stored in the map DB 160.

(4) Object DB

The object DB 140 is a database that stores feature data expressing features of objects in advance. The feature data stored in the object DB 140 is used in an image recognition process by the image recognizing unit 145. FIG. 10 is a diagram useful in explaining one example of the composition of the feature data.

In FIG. 10, feature data 141 is shown as one example for a real object RO1. The feature data 141 includes an object ID 142a, image data picked up from six directions 142b, patch data 142c, and three-dimensional form data 142d.

The object ID 142a is an identifier for uniquely identifying the real object RO1. The image data 142b includes image data for six images where the real object RO1 has been respectively photographed from six directions, namely in front, behind, the left, the right, above, and below. The patch data 142c is a group of small images for each feature point set on a real object, with each small image being centered on the corresponding feature point. The three-dimensional form data 142d includes position information expressing the three-dimensional position of each feature point in a local coordinate system of the real object RO1 (that is, the position of each feature point relative to an origin locally defined on the real object RO1).

(5) Image Recognizing Unit

The image recognizing unit 145 uses the above-described feature data stored by the object DB 140 to recognize what real objects appear in an input image. More specifically, as one example the image recognizing unit 145 matches partial images included in the input image acquired by the image acquiring unit 120 against patches of each feature point included in the feature data to detect feature points included in the input image. The image recognizing unit 145 may reuse the result of tracking feature points produced by the SLAM computation unit 135. Next, when feature points belonging to one real object have been detected with a high density in a given area in an image, the image recognizing unit 145 may recognize that such real object appears in this area. The image recognizing unit 145 may further recognize the position and posture of the recognized real object based on the positional relationship between the detected feature points and the three-dimensional data illustrated in FIG. 10. Tracking of the position and posture of the real object after initialization of SLAM is realized based on the position and posture of the real object recognized by the image recognizing unit 145 and the position and posture of the image pickup unit 102 recognized by the SLAM computation unit 135. The image recognizing unit 145 outputs the position and posture of the real object tracked in this way to the map management unit 165 to have the position and posture stored in the map DB 160.

(6) Map Management Unit

The map DB 160 is a database storing the results of environment recognition by the recognizing unit 130. As one example, the map DB 160 stores the position and posture of the image pickup unit 102 recognized by the SLAM computation unit 135 and the positions and postures of real objects recognized by the image recognizing unit 145. The application unit 170 and the display control unit 180 described later may use such data stored by the map DB 160 to decide the layout of the virtual objects in the AR space.

In addition, the map DB 160 may store a feature point map, described later. The feature point map stores the positions in a real space of at least one feature point detected in the past. The feature point map may be used in a navigation control process by the display control unit 180.

The map management unit 165 manages data stored by the map DB 160 and the inputting and outputting of such data. For example, as described later, the map management unit 165 may attach a time stamp showing the registration time (creation time or modification time) to the data stored by the map DB 160 and may discard data if a certain time has passed from the registration time.

(7) Application Unit

The application unit 170 provides an AR application to the user based on the result of environment recognition by the recognizing unit 130. The AR application provided by the application unit 170 may be an application for any purpose, object, such as entertainment, education, business, or social communication. The application unit 170 typically selects virtual objects (annotations) to be displayed in accordance with such purpose and lays out the selected virtual objects in the AR space. In the example in FIG. 1, the virtual object VO1 is laid out so as to appear just as if the object were present on the table 14. The two-dimensional position where the virtual object VO1 is overlaid on the image may be calculated based on the relative positional relationship between the image pickup unit 102 and the table 14 and the layout of the virtual object VO1 in the AR space.

(8) Display Control Unit

The display control unit 180 controls the displaying of the AR application that uses the display unit 110. Also, the display control unit 180 navigates the user that operates the image processing apparatus 100 in accordance with the distribution of the feature points so as to stabilize the recognition process carried out by the recognizing unit 130. For example, the display control unit 180 may navigate the user so that a number of feature points that exceeds a threshold continuously appear in the input images. The display control unit 180 may also navigate the user so as to avoid a state where the feature points become biased in one part of the input images. The display control unit 180 may also navigate the user so that the image processing apparatus 100 is operated (moved) more slowly the lower the number of feature points appearing in the input images.

FIG. 11 is a diagram useful in explaining a first method of deciding the navigation direction in accordance with the distribution of the feature points. FIG. 11 shows an enlargement of an image Im10 illustrated in FIG. 3. Textures where a certain amount is exceeded are present in the vicinity of an upper end, a lower end, and the right end of the image Im10. Accordingly, even if the user moves the camera angle upward, downward, or to the right, it is possible for the display control unit 180 to predict that a number of feature points that exceeds a threshold will continuously appear in the input images. On the other hand, no texture is present in the vicinity of the left end of the image Im10. Accordingly, if the user moves the camera angle to the left, the display control unit 180 is capable of predicting that the number of feature points appearing in the input images will fall. Based on such predictions, the display control unit 180 may navigate the user so as to move the camera angle in the upward, downward, or rightward direction (or so that the user does not move the camera angle in the leftward direction. According to this first method, navigation is controlled using the input images only. Accordingly, there is no need for additional memory resources and it is possible to realize the technology according to the present disclosure with a low development cost. Note that the display control unit 180 may increase the probability of new feature points being detected by urging the user to zoom out so as to include a wider range within the camera angle.

FIG. 12 is a diagram useful in explaining a second method of deciding the navigation direction in accordance with the distribution of the feature points. A feature point map 162 that may be additionally stored by the map DB 160 is schematically shown in FIG. 12. Here, although a map with a two-dimensional structure is shown here for ease of explanation, the feature point map 162 may have a three-dimensional structure. In the feature point map 162 in FIG. 12, the positions of at least one feature point are shown in an X-Y coordinate system. The X-Y plane is divided into a plurality of areas in a crosshatch pattern. Each area may be identified as area A1, area A2, or the like by a combination of a label "A" to "E" in the X direction and a label "1" to "5" in the "Y" direction. In the example in FIG. 12, the areas B4, C2 to C4, D2, D3, E3, and E4 include large number of feature points that are distributed comparatively uniformly in such areas. Accordingly, if the camera is pointed toward such areas, a number of feature points that exceeds the threshold will appear and such feature points will not be biased toward one part of the image. In the present specification, such areas are referred to as "stable recognition areas". By referring to such a feature point map 162, determining the stable recognition areas, and navigating the user so that the stable recognition areas are continuously picked up, the display control unit 180 may stabilize the recognition process by the recognizing unit 130. Since it is possible, according to this second method, to use a feature point map to determine the presence and positions of feature points that do not appear in an input image, it is possible to appropriately navigate the user in keeping with the state of the real space.

In addition to a first operation mode where the user is navigated as described above to stabilize the environment recognition process, the display control unit 180 may also be capable of operating in a second operation mode that navigates the user so as to increase the number of feature points registered in the feature point map. In the present specification, such first operation mode is referred to as "normal mode" and the second operation mode is referred to as "exploration mode". In exploration mode, the display control unit 180 may navigate the user to pick up images of areas outside the stable recognition areas instead of the stable recognition areas.

The feature point map 162 may be configured so that explored areas and unexplored areas can be identified. An explored area is an area that has already been picked up in the past and an unexplored area is an area that is yet to be picked up. In the example of the feature point map 162 shown in FIG. 12, the areas A1, A2, B1, and B2 are identified as unexplored areas. In the feature point map 162, feature points are not registered in the unexplored areas. However, this does not mean that no feature points are present in the unexplored areas, and instead means that it is not known whether feature points are present in such areas. By having the user pick up such unexplored areas, the display control unit 180 is capable of discovering new feature points and thereby increasing the stable recognition areas.

2-3. Example of Navigation

Navigation by the display control unit 180 is carried out by overlaying navigation objects on the input images. The type of navigation depends on the type of navigation objects. Here, three types of object, that is, autonomous operation agents, virtual indications and user-operated agents or (avatars) are given as examples of different types of navigation object. Note that such navigation objects may be the same as the virtual objects used in an AR application or may be dedicated virtual objects used for navigation.

(1) Autonomous Operation Agent

An autonomous operation agent is a virtual object that operates autonomously within an AR space. As one example, in normal mode the display control unit 180 may move an autonomous operation agent in a direction for which image pickup is recommended. If the user points and is about to operate the image pickup unit 102 in a direction for which image pickup is not recommended, the display control unit 180 may have the autonomous operation agent carry out an action that obstructs such operation. As another example, in exploration mode the display control unit 180 may move the autonomous operation agent to an unexplored area.

FIG. 13 is a diagram useful in explaining a first example of navigation by an autonomous operation agent. As shown in FIG. 13, an autonomous operation agent VO2 is present in an AR space formed by expanding a real space 20. In reality, the agent VO2 first appears on the screen to the user when a location where the VO2 is present is picked up by the camera. At a given time, assume that the agent VO1 is positioned at a position P11 in the AR space and is about to move to a position P16. Here, if the agent VO2 moves in a straight line from the position P11 to the position P16 and the user attempts to keep the agent VO2 within the camera angle (i.e., the frame), there is a high probability of the environment recognition process failing in an area in the vicinity of a position P19 where there are no (or few) feature points. For this reason, instead of moving the agent VO2 in a straight line to the position P16, the display control unit 180 moves the agent Vo2 along a route that traces positions P12, P13, P14, and P15 where a sufficient number of feature points are present. As a result, even if the user attempts to keep the agent VO2 within the camera angle, the movement of the agent VO2 to the position P16 is likely to succeed without the environment recognition process failing. The display control unit 180 also moves the agent VO2 slowly in a section between the position P13 and the position P15 where the number of feature points present in the vicinity falls. By doing so, it is possible to suppress the proportion of feature points where tracking will fail out of the set of feature points and make effective use of a temporarily lower number of feature points, thereby preventing a drop in the precision of the environment recognition process.

FIG. 14 is a diagram useful in explaining a second example of navigation by an autonomous operation agent. In FIG. 14, the user is attempting to move the camera angle in a direction away from a stable recognition area. The display control unit 180 recognizes such operation from the result of the environment recognition process and has the agent VO2 carry out an action that obstructs such operation. In the example in FIG. 14, the agent VO2 gives the user a message MSG indicating that movement in a direction away from the stable recognition area is unfavorable. Such message MSG may be a virtual object or may be an audio message. In place of the message given as an example in FIG. 14, the action that obstructs the user operation may be a facial expression, gesture, or the like of the agent VO2.

FIG. 15 is a diagram useful in explaining a third example of navigation by an autonomous operation agent. Although the first and second examples described above are examples of navigation in normal mode, this third example is an example of navigation in exploration mode. In FIG. 15, the same real space 20 as FIG. 13 is shown and the autonomous operation agent VO2 is position at the position P11. In exploration mode, the display control unit 180 moves the agent VO2 in the direction of a position P19 outside the stable recognition areas. It is assumed here that the user attempts to keep the agent VO2 within the camera angle (i.e., the frame). As a result, real objects RO2 and RO3 that are present in the vicinity of the position P19 appear in the input images and the feature points present on such real objects are newly discovered. The area in the vicinity of the position P19 may then be newly identified as a stable recognition area.

Note that if the recognized real object is a moving object, there is the possibility of the information on feature points or the information on areas stored in the feature point map becoming obsolete as a result of movement of such object. For this reason, the map management unit 165 adds a time stamp to each feature point when the position of each feature point is registered in the feature point map (that is, a registration time is stored in association with a feature point or area). The map management unit 165 may then discard data in the feature point map according to the time that has elapsed since such registration times. By doing so, it is possible to prevent the stability of the environment recognition process from conversely dropping due to navigation based on obsolete information.

(2) Virtual Indications

Virtual indications are simple virtual objects such as graphics, icons or text. As one example, the display control unit 180 may overlay, on the input images, virtual indications for informing the user of an area in the real space for which image pickup is not recommended. In addition to or as an alternative to this, the display control unit 180 may overlay, on the input images, virtual indications for informing the user of a score that depends on the number or biasing of the feature points appearing in the input images.

FIG. 16 is a diagram useful in explaining a first example of navigation by virtual indications. FIG. 16 shows the image processing apparatus 100 which is displaying an image in which the real space 10 appears. Virtual indications V03 and V04 are displayed on the screen of the image processing apparatus 100. The virtual indication V03 is an indication showing a boundary between the stable recognition areas and other areas. The virtual indication V04 is also an indication showing areas aside from stable recognition areas. By looking at such indications, the user can operate the terminal so that the stable recognition areas continuously appear in the input images. Also, by deliberately picking up unexplored areas in exploration mode, the user can also increase the stable recognition areas.

FIG. 17 is a diagram useful in explaining a second example of navigation by virtual indications. In the example in FIG. 17, a virtual indication V05 is transparently displayed on the screen of the image processing apparatus 100. The virtual indication V05 is an indication where scores that depend on the number of feature points or the biasing of the distribution of the feature points are shown for each area of a constant size by way of an attribute such as the brightness or color of the area. In the example in FIG. 17, each area is indicated by the virtual indication V05 using different colors as one of a first area where environment recognition is possible with high stability, a second area where environment recognition is possible with less stability, and a third area where environment recognition is difficult (i.e., "least stable"). By looking at such indication, the user can operate the terminal so that the stable recognition areas continuously appear in the input images.

FIG. 18 is a diagram useful in explaining a third example of navigation by virtual indications. In the example in FIG. 18, a virtual indication V06 is displayed on the screen of the image processing apparatus 100. The virtual indication V06 is an indicator showing the magnitude of a score that depends on the number of feature points or the biasing of the distribution of the feature points in the image. The virtual indication V06 informs the user of changes in the score described above in keeping with changes in the camera angle. In the example on the right in FIG. 18, a fall in the score is shown by the virtual indication V06 together with a message V07 informing the user of the risk that environment recognition will fail. By displaying such indication, user operations are indirectly obstructed, making it possible to avoid environment recognition failures or a drop in the stability of the environment recognition process.

(3) User-Operated Agent

A user-operated agent is a virtual object operated by the user in the AR space. As one example, the display control unit 180 may navigate the user by limiting the movable area of a user-operated agent to an area for which image pickup is recommended. The area for which image pickup is recommended may be stable recognition areas in normal mode and may include both stable recognition areas and unexplored areas in exploration mode.

FIG. 19 is a diagram useful in explaining an example of navigation by a user-operated agent. In FIG. 19, a user-operated agent VO8 is present in an AR space formed by expanding the real space 10. An area below and to the right of the agent VO8 is an area with no (or few) feature points. As one example, the user operates the agent VO8 via a drag operation on the screen. However, in the state shown in FIG. 19, if the user performs a drag toward the lower right (in the direction of the arrow Arr1 in the drawing), the display control unit 180 will obstruct movement of the agent VO8 in such direction and for example may instead move the agent VO8 in a direction toward the upper right (in the direction of the arrow Arr2 in the drawing). By limiting the movable area of the user-operated agent in this way, it is possible to navigate the user so as to continuously pick up stable recognition areas.

2-4. Flow of Processing (1) Overall Flow

FIG. 20 is a flowchart showing one example of the overall flow of image processing according to the present embodiment.

As shown in FIG. 20, the image acquiring unit 120 first acquires an input image generated by image pickup of a real space (step S110). The image acquiring unit 120 then outputs the acquired input image to the recognizing unit 130 and the display control unit 180.

Next, the recognizing unit 130 executes the environment recognition process based on the position(s) of at least one feature point appearing in the input image to recognize the position and posture of the image pickup apparatus relative to the real space (step S120). The environment recognition process carried out here may include the SLAM computation process described with reference to FIG. 6 for example. The recognizing unit 130 stores the result of environment recognition, that is, the position and posture of the camera in the environment, the positions of feature points, and the positions and postures of real objects in the map DB 160.

Next, the application unit 170 carries out the operations of an AR application based on the result of environment recognition by the recognizing unit 130 (step S130). As one example, the application unit 170 lays out a virtual object selected in accordance with the purpose of the application in association with one of the real objects appearing in the input images.

Next, the display control unit 180 carries out a navigation control process so as to stabilize the environment recognition process (step S140). Three detailed examples of the navigation control process carried out here are described below.

The display control unit 180 then overlays virtual objects for the AR application laid out by the application unit 170 and navigation objects on the input image (step S170).

(2) First Example of Navigation Control Process

FIG. 21 is a flowchart showing one example of the flow of a navigation control process when an autonomous operation agent is used.

As shown in FIG. 21, the display control unit 180 first acquires the distribution of feature points from the map DB 160 (step S141). The subsequent processing then branches according to whether the operation mode is normal mode or exploration mode (step S142). If the operation mode is normal mode, the processing advances to step S143. Meanwhile, if the operation mode is exploration mode, the processing advances to step S147. Note that the exploration mode may be selected to construct the AR space in an initialization phase of the AR application, for example, or may be selected at other timing.

In normal mode, the display control unit 180 estimates the movement of the terminal from the result of the environment recognition process (step S143). The display control unit 180 determines whether the user is attempting to pick up an area that is not recommended (for example, an area aside from the stable recognition areas) (step S144). For example, if it is predicted that the camera angle will move away from the stable recognition area if the movement of the terminal in the most recent few frames continues, the display control unit 180 may determine that the user is trying to pick up an area that is not recommended. If it is determined that the user is trying to pick up an area that is not recommended, the processing advances to step S145. Meanwhile if this is not the case, the processing advances to step S146.

In step S145, the display control unit 180 decides the action of an autonomous operation agent that obstructs the operation by the user (step S145). The action decided here may be an action such as that described with reference to FIG. 14, for example.

In step S146, the display control unit 180 decides the movement of the autonomous operation agent in accordance with the distribution of the feature points (step S146). The movement decided here may be movement that traces the stable recognition areas as described above with reference to FIG. 13, for example.

In step S147, since the display control unit 180 is operating in exploration mode, the display control unit 180 decides on a movement of the autonomous operation agent toward an unexplored area (step S147).

The movement (or action) of the agent decided in steps S145, S146 and S147 is displayed on a screen in step S170 in the flow illustrated in FIG. 20 and is seen by the user.

(3) Second Example of Navigation Control Process

FIG. 22 is a flowchart showing an example of the flow of the navigation control process in a case where virtual indications are used.

In FIG. 22, the display control unit 180 first acquires the distribution of feature points from the map DB 160 (step S151). The subsequent processing branches according to whether the operation mode is normal mode or exploration mode (step S152). If the operation mode is normal mode, the processing advances to step S153. Meanwhile, if the operation mode is exploration mode, the processing advances to step S157.

In normal mode, the display control unit 180 generates at least one virtual indication in accordance with the distribution of feature points (step S153). The virtual indication(s) generated here may be the indication(s) that were described with reference to FIGS. 16 to 18, for example.

Next, the display control unit 180 estimates the movement of the terminal from the result of the environment recognition process (step S154). The display control unit 180 then determines whether the user is attempting to pick up an area that is not recommended (step S155). If it is determined that the user is trying to pick up an area that is not recommended, the display control unit 180 additionally generates virtual indications to warn the user or changes the attributes of the virtual indications generated in step S153 (step S156).

In step S157, since the display control unit 180 is operating in exploration mode, the display control unit 180 generates virtual indications for notifying the user of unexplored areas, for example (step S157).

The virtual indication(s) generated in steps S153, S156, or S157 is/are displayed on a screen in step S170 in the flow illustrated in FIG. 20 and is/are seen by the user.

(4) Third Example of Navigation Control Process

FIG. 23 is a flowchart showing an example of the flow of the navigation control process in a case where a user-operated agent is used.

In FIG. 23, the display control unit 180 first acquires the distribution of feature points from the map DB 160 (step S161). The display control unit 180 acquires a user input that is received in order to operate an agent (step S162).

The subsequent processing branches according to whether the operation mode is normal mode or exploration mode (step S163). If the operation mode is normal mode, the processing advances to step S164. Meanwhile, if the operation mode is exploration mode, the processing advances to step S166.

In normal mode, the display control unit 180 decides the movable area in the AR space in accordance with the distribution of feature points (step S164). The display control unit 180 then decides the movement of the user-operated agent in accordance with the user input within a range of the decided movable area (step S165).

In exploration mode, the display control unit 180 decides movement of the user-operated agent in keeping with the user input without restricting the movement to a movable area (step S166).

The movement of the agent decided in step S165 or S166 is displayed on a screen in step S170 in the flow illustrated in FIG. 20 and is seen by the user.

3. Conclusion

This completes the detailed description of embodiments of the present disclosure with reference to FIGS. 1 to 22. According to the embodiments described above, when an environment is recognized based on the position(s) of feature point(s) appearing in an input image and an AR application that uses the result of such recognition is provided, the user is navigated in accordance with the distribution of feature points so as to stabilize the environment recognition process. Accordingly, it is possible to avoid a situation where environment recognition becomes unstable and hinders the use of an AR application.

According to the embodiment described above, as one example navigation is carried out using navigation objects so that a number of feature points that exceeds a threshold continuously appear in the input images. Accordingly, since a sufficient number of feature points can be kept in the input images, it is possible to recognize the relative positional relationship between the real space and the image pickup apparatus while an AR application is being provided and thereby ensure that the application is available.

In addition, according to the embodiment described above, navigation is carried out using navigation objects so as to avoid biasing of the feature points in part of the input images, for example. Accordingly, while an AR application is being provided, the relative positional relationship between the real space and the image pickup apparatus is recognized stably and with high precision, which makes it possible to prevent problems such as virtual objects being laid out at inappropriate positions or with inappropriate postures.

The series of control processes carried out by each apparatus described in the present specification may be realized by software, hardware, or a combination of software and hardware. Programs that compose such software may be stored in advance for example on a storage medium provided inside or outside each of the apparatus. As one example, during execution, such programs are written into RAM (Random Access Memory) and executed by a processor such as a CPU.

Instead of being implemented in the present apparatus itself, some of the logical functions of the apparatus may be implemented in an apparatus present in a cloud computing environment. In such case, the information exchanged between the logical functions may be transmitted or received between apparatuses via the communication unit 112 illustrated in FIG. 4.

Although preferred embodiments of the present disclosure are described in detail above with reference to the appended drawings, the technical scope of the disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:

an image acquiring unit acquiring an input image generated by image pickup of a real space using an image pickup apparatus;

a recognizing unit recognizing a position and posture of the image pickup apparatus relative to the real space based on a position or positions of at least one feature point appearing in the input image;

an application unit that provides an augmented reality application that uses the recognized relative position and posture; and a display control unit overlaying a navigation object, which guides a user operating the image pickup apparatus, on the input image in accordance with a distribution of the feature points so as to stabilize the recognition process carried out by the recognizing unit.

(2) The image processing apparatus according to (1), wherein the display control unit navigates the user using the navigation object so that a number of the feature points that exceeds a threshold continuously appear in the input image.

(3) The image processing apparatus according to (2), wherein the display control unit navigates the user using the navigation object so as to avoid biasing of the feature points in part of the input image.

(4) The image processing apparatus according to (2) or (3), wherein the display control unit guides the user using the navigation object so that the lower the number of feature points appearing in the input image, the slower the image pickup apparatus is operated.

(5) The image processing apparatus according to any one of (2) to (4), wherein the navigation object is an agent that operates autonomously in the augmented reality space, and the agent moves in a direction in which image pickup is recommended.

(6) The image processing apparatus according to (5), wherein the agent is operable when the image pickup apparatus is about to be subjected to an operation in a direction for which image pickup is not recommended, to carry out an action that obstructs the operation.

(7) The image processing apparatus according to any one of (2) to (4),
wherein the navigation object is an indication that notifies the user of an area in the real space for which image pickup is not recommended.

(8) The image processing apparatus according to any one of (2) to (4),
wherein the navigation object is an indication that notifies the user of a score in keeping with the number or biasing of the feature points appearing in the input image.

(9) The image processing apparatus according to any one of (2) to (4),
wherein the navigation object is an agent operated by the user in the augmented reality space, and
a movable area of the agent is limited to an area for which image pickup is recommended.

(10) The image processing apparatus according to any one of (1) to (9),
further including a storage unit storing a feature point map showing positions in the real space of at least one feature point detected in the past,
wherein the display control unit uses the feature point map to determine an area in the real space for which image pickup results in the recognition process being stabilized.

(11) The image processing apparatus according to any one of (1) to (10),
wherein the display control unit is operable in a first operation mode to use the navigation object to guide the user so that the recognition process is stabilized and is operable in a second operation mode to guide the user so that unknown feature points are discovered.

(12) The image processing apparatus according to (11),
wherein the display control unit is operable in the second operation mode to guide the user so that image pickup is carried out for an unexplored area that is yet to be subjected to image pickup by the image pickup apparatus.

(13) The image processing apparatus according to (12),
wherein the navigation object is an agent that operates autonomously in the augmented reality space, and
the agent moves in a direction of the unexplored area in the second operation mode.

(14) The image processing apparatus according to (10),
wherein the storage unit stores a registration time of data relating to each feature point in the feature point map in association with the data, and
the image processing apparatus further includes a map management unit discarding the data in accordance with an elapsed time from the registration time.

(15) The image processing apparatus according to any one of (1) to (14),
wherein the image processing apparatus is a mobile terminal and further includes the image pickup apparatus.

(16) The image processing apparatus according to any one of (1) to (15),
wherein at least one out of the image acquiring unit, the recognizing unit, the application unit, and the display control unit is realized by an apparatus present on a cloud computing environment instead of being provided in the image processing apparatus.

(17) An image processing method including:
acquiring an input image generated by image pickup of a real space using an image pickup apparatus;
carrying out a recognition process recognizing a position and posture of the image pickup apparatus relative to the real space based on a position or positions of at least one feature point appearing in the input image;
providing an augmented reality application that uses the recognized relative position and posture; and
overlaying a navigation object, which guides a user operating the image pickup apparatus, on the input image in accordance with a distribution of the feature points so as to stabilize the recognition process.

(18) A program for causing a computer controlling an image processing apparatus to function as:
an image acquiring unit acquiring an input image generated by image pickup of a real space using an image pickup apparatus;
a recognizing unit recognizing a position and posture of the image pickup apparatus relative to the real space based on a position or positions of at least one feature point appearing in the input image;
an application unit that provides an augmented reality application that uses the recognized relative position and posture; and
a display control unit overlaying a navigation object, which guides a user operating the image pickup apparatus, on the input image in accordance with a distribution of the feature points so as to stabilize the recognition process carried out by the recognizing unit.

Additionally, the present technology may also be configured as below.

(1) An information processing system including: circuitry configured to: acquire image data captured by an image capturing device; identify a density of distribution of a plurality of feature points in the acquired image data; control a display to display guidance information based on the density of the distribution of the plurality of feature points.

(2) The information processing system of (1), wherein the circuitry is configured to control the display to display a virtual image overlaid on the displayed acquired image data and display, as the guidance information, a predetermined effect corresponding to the virtual image overlaid on the acquired image data.

(3) The information processing system of (2), wherein the predetermined effect corresponding to the virtual image overlaid on the acquired image data indicates a level of stability of an augmented reality (AR) process in each of a plurality of areas of the displayed acquired image data.

(4) The information processing system of any of (1) to (3), wherein the circuitry is configured to execute an augmented reality (AR) process by controlling the display to display a virtual object overlaid on the displayed acquired image data.

(5) The information processing system of any of (1) to (4), wherein the circuitry is configured to continuously track feature points included in acquired image data to map a real space corresponding to the acquired image data.

(6) The information processing system of any of (1) to (5), wherein the circuitry is configured to display, as the guidance information, instructions to navigate the image capturing device so that a number of feature points included in the captured image data exceeds a predetermined threshold value.

(7) The information processing system of any of (1) to (6), wherein the circuitry is configured to display, as the guidance information, instructions to navigate the image capturing device to avoid a state where the feature points are biased in a particular region of the captured image data.

(8) The information processing system of any of (1) to (7), wherein the circuitry is configured to display, as the guidance information, instructions to navigate the image capturing device at a predetermined speed based on the density of the distribution of the plurality of feature points.

(9) The information processing system of any of (1) to (8), wherein the circuitry is configured to determine a density of a plurality of feature points in at least an upper edge region, lower edge region, right edge region and left edge region of the acquired image data.

(10) The information processing system of (9), wherein the circuitry is configured to predict whether a number of feature points exceeding a predetermined threshold will exist in subsequent captured image data if the image capturing device is directed at least one of the upper, lower, right or left direction based on the determined density of the plurality of feature points in at least the upper edge region, the lower edge region, the right edge region and the left edge region of the acquired image data.

(11) The information processing system of (10), wherein the circuitry is configured to control the display to display the guidance information based on the prediction.

(12) The information processing system of (5), wherein the circuitry is configured to identify at least one area in the real space in which a number of feature points included in the captured image data exceeds a predetermined threshold value.

(13) The information processing system of (12), wherein the circuitry is configured to control the display to display, as the guidance information, instructions to navigate the image capturing device to the at least one area in the real space in which the number of feature points included in the captured image data exceeds the predetermined threshold value.

(14) The information processing system of (5), wherein the circuitry is configured to identify at least one area in the real space for which image data has not yet been captured.

(15) The information processing system of (14), wherein the circuitry is configured to control the display to display, as the guidance information, instructions to navigate the image capturing device to the at least one area in the real space for which image data has not yet been captured.

(16) The information processing system of any of (1) to (15), wherein the circuitry is configured to control the display to display, as the guidance information, a virtual image overlaid on the displayed acquired image data.

(17) The information processing system of (16), wherein the circuitry is configured to control the display to move the virtual image overlaid on the displayed acquired image data in a direction corresponding to a recommended navigation direction of the image capturing device based on the density of the distribution of the plurality of feature points.

(18) The information processing system of any of (1) to (17), wherein the circuitry is configured to control the display to display, as the guidance information, a virtual image overlaid on the displayed acquired image data that indicates a level of stability of an augmented reality (AR) process in the displayed acquired image data.

(19) The information processing system of (2), wherein the virtual object is configured to be controlled by an instruction input by a user, and the circuitry is configured to control the display to display, as the guidance information, an instruction contradicting an instruction input by the user to control the virtual object.

(20) An information processing method including: acquiring image data captured by an image capturing device; identifying a density of distribution of a plurality of feature points in the acquired image data; controlling a display to display guidance information based on the density of the distribution of the plurality of feature points.

(21) A non-transitory computer-readable medium including computer program instructions, which when executed by circuitry, causes the circuitry to perform: acquiring image data captured by an image capturing device; identifying a density of distribution of a plurality of feature points in the acquired image data; controlling a display to display guidance information based on the density of the distribution of the plurality of feature points.

REFERENCE SIGNS LIST

100 Image processing apparatus
102 Image pickup unit
120 Image acquiring unit
130 Recognizing unit
162 Feature point map
170 Projection control unit
180 Display control unit

The invention claimed is:
1. An information processing apparatus, comprising:
circuitry configured to:
    acquire image data of a real space by an image capturing device;
    detect a plurality of feature points based on the image data;
    calculate a relative position of at least one feature point from the plurality of feature points with respect to the image capturing device;
    generate environment information based on the calculated relative position;
    determine an un-explored area and an explored area based on the generated environment information; and
    generate a direction control instruction to direct the information processing apparatus to move into the un-explored area to acquire additional environment information of the un-explored area.

2. The information processing apparatus of claim 1, wherein the circuitry is further configured to continuously update the explored area and the un-explored area based on the acquired additional environment information.

3. The information processing apparatus of claim 1, wherein the generated environment information includes a map.

4. The information processing apparatus of claim 3, wherein the circuitry is further configured to detect a position of the information processing apparatus on the map.

5. The information processing apparatus of claim 4, wherein the circuitry is further configured to detect the position of the information processing apparatus based on simultaneous localization and mapping (SLAM).

6. The information processing apparatus of claim 3, wherein the map indicates a three dimensional location and a shape of real objects within the real space.

7. The information processing apparatus of claim 3, wherein the map is a three-dimensional map.

8. An information processing method, comprising:
in an information processing apparatus:
    acquiring image data of a real space by an image capturing device;
    detecting a plurality of feature points based on the image data;
    calculating a relative position of at least one feature point from the plurality of feature points with respect to the image capturing device;
    generating environment information based on the calculated relative position;

determining an un-explored area and an explored area based on the generated environment information; and generating a direction control instruction to direct the information processing apparatus to move into the un-explored area to acquire additional environment information of the un-explored area.

9. The information processing method of claim 8, wherein the explored area and the un-explored area are continuously updated based on the acquired additional environment information.

10. The information processing method of claim 8, wherein the generated environment information includes a map.

11. The information processing method of claim 10, wherein a position of the information processing apparatus is detected on the map.

12. The information processing method of claim 11, wherein the position of the information processing apparatus is detected based on simultaneous localization and mapping (SLAM).

13. The information processing method of claim 10, wherein the map indicates a three dimensional location and a shape of real objects within the real space.

14. The information processing method of claim 10, wherein the map is a three-dimensional map.

15. A non-transitory computer-readable medium having stored thereon computer-executable instructions that, when executed by a processor, cause a computer to execute operations, the operations comprising:

acquiring image data of a real space by an image capturing device;

detecting a plurality of feature points based on the image data;

calculating a relative position of at least one feature point from the plurality of feature points with respect to the image capturing device;

generating environment information based on the calculated relative position;

determining an un-explored area and an explored area based on the generated environment information; and generating a direction control instruction to direct an information processing apparatus to move into the un-explored area to acquire additional environment information of the un-explored area.

* * * * *